United States Patent
Saito

(10) Patent No.: US 8,232,330 B2
(45) Date of Patent: *Jul. 31, 2012

(54) NONAQUEOUS INK, IMAGE-RECORDING METHOD, IMAGE-RECORDING APPARATUS AND RECORDED ARTICLE

(75) Inventor: Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 12/700,517

(22) Filed: Feb. 4, 2010

(65) Prior Publication Data

US 2010/0196680 A1     Aug. 5, 2010

(30) Foreign Application Priority Data

Feb. 5, 2009   (JP) ................................. 2009-025352

(51) Int. Cl.
*C09D 11/10* (2006.01)
(52) U.S. Cl. ..... 523/160; 524/555; 524/556; 428/195.1; 428/207; 427/466
(58) Field of Classification Search .................. 523/160; 524/555, 556; 428/195.1, 207; 427/466
See application file for complete search history.

(56) References Cited

U.S. PATENT DOCUMENTS

| | | | | |
|---|---|---|---|---|
| 6,913,352 B2 * | 7/2005 | Yoshihiro et al. | ............. | 347/100 |
| 6,949,138 B2 * | 9/2005 | Nakamura et al. | ............. | 106/401 |
| 2009/0085017 A1 * | 4/2009 | Nemoto | ........................ | 252/586 |

FOREIGN PATENT DOCUMENTS

| | | |
|---|---|---|
| EP | 1 892 573 A1 | 2/2008 |
| EP | 2 009 070 A1 | 12/2008 |
| JP | 2000-504778 A | 4/2000 |
| JP | 3619778 A | 12/2001 |
| JP | 2003-113341 A | 4/2003 |
| JP | 2003-128955 A | 5/2003 |
| JP | 2005-179506 A | 7/2005 |
| JP | 2008-150507 A | 7/2008 |

OTHER PUBLICATIONS

The Porphyrin Handbook: Applications of Phthalocyanines edited by Kadish et al., published by Elsevier 2003, pp. 129 & 130.*
Extended European Search Report corresponding to Application No. 10152579.8, Patent No. 2102 dated May 18, 2010.

* cited by examiner

*Primary Examiner* — David W Wu
*Assistant Examiner* — Vu A Nguyen
(74) *Attorney, Agent, or Firm* — Sughrue Mion, PLLC

(57) ABSTRACT

A nonaqueous ink, having: colorant particles, the colorant particles having an average particle diameter of 1 nm or more and less than 50 nm, and the value ($D_{90}$-$D_{10}$) of being 100 nm or less, a dispersant; and a radical-polymerization compound; wherein $D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function $dG=F(D)dD$; and G represents the number of the pigment particles; and D represents the diameter of the particles.

11 Claims, No Drawings

NONAQUEOUS INK, IMAGE-RECORDING METHOD, IMAGE-RECORDING APPARATUS AND RECORDED ARTICLE

FIELD OF THE INVENTION

The present invention relates to a nonaqueous ink, an image-forming method, an image-forming apparatus and a recorded article.

BACKGROUND OF THE INVENTION

Inkjet recording process has been in rapid progress in various fields, because high-definition images can be recorded in a relatively simple apparatus. Applications of such process have also been diversified, and thus various recording media or inks suitable for respective applications are selected. In recent years, application of the inkjet recording process to industrial fields is under study, and in particular, the development is advanced to provide printers having performances satisfying the requirements of an on-demand type application of carrying out facilitated printing.

The process and the ink used for recording are also studied from various points. For example, an inkjet recording inks, that are hardened when they are exposed to an ultraviolet ray, are in development. Such an ink has a significantly shortened image-fixing period and improved fixing efficiency, compared to inks that should be air-dried or left for penetration into the substrate. However, there is still a need for further improvement of hardening velocity and reduction of hardening energy. It is important in industrial application that the image is brilliant and highly vivid, and also, that a great number of prints are formed in an extremely short period of time at low energy consumption.

As to the UV-hardening inks as described above, radical-hardening inks mainly based on acrylic compositions are studied (see e.g., Japanese Patent No. 3619778 and JP-T-2000-504778 ("JP-T" means published Japanese translation of PCT application). Further, reduction in the size of pigment particles contained in an ink is attempted for improvement of image brilliance, but the diameter of the particles is 120 nm or more, even if the smallest one, for example, specifically disclosed in JP-A-2005-179506 ("JP-A" means unexamined published Japanese patent application). On the other hand, radical-polymerization inks have a problem that the hardening efficiency is reduced by polymerization inhibition caused by oxygen.

In addition, as a colorant for color filter, colored resin-fine particles having an average diameter of 100 nm or less, which contains a water-insoluble colorant, are disclosed (see JP-A-2008-150507). The resin component of the colored resin-fine particles includes a hydrophilic resin and a hydrophobic resin, and the average diameter of the water-insoluble colorant is 50 nm or less. By the use of such particles, it is reported that improvement can be shown in color-developing efficiency and image fastness of the resulting printed article. However, a step of dispersing the fine water-insoluble colorant particles as resin fine-particles require extremely long period and increased energy. Further, bulky particles may be unwillingly contained due to less dispersion ability of the water-insoluble colorant particles. Further, use of the particles in a nonaqueous ink makes dispersion more difficult, and it is not clear whether the favorable dispersion state can be achieved.

On the other hand, as an aqueous ink which does not demand hardening by ultraviolet ray or the like, it is disclosed that an ink containing pigment particles made in a smaller diameter and in a narrower particle diameter distribution for improving a bronzing property, a glossiness property, and others (see, e.g., JP-A-2003-113341 and JP-A-2003-128955). When used in such an aqueous ink, for example, the pigment fine particles having a particle diameter of 30 nm or less, as disclosed in the Patent Documents above, can be utilized in a stabilized state. However, it is not obvious whether such a nonaqueous hardening ink can show favorable ink properties, while preserving its light resistance sufficiently, to be used as an ink which is fixed to be an image by irradiation of an activating energy ray such as ultraviolet ray or by heating.

SUMMARY OF THE INVENTION

The present invention resides in a nonaqueous ink, comprising:
colorant particles, the colorant particles having an average particle diameter of 1 nm or more and less than 50 nm, and the value ($D_{90}$-$D_{10}$) of being 100 nm or less,
a dispersant; and
a radical-polymerization compound;
wherein $D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.

Further, the present invention resides in a nonaqueous ink, comprising: a dispersant, a radical-polymerization compound, and colorant particles,
the colorant particles obtained by a precipitation process of bringing a colorant dissolved solution into contact with an aqueous medium, at least one of the pigment dissolved solution and an aqueous medium containing the dispersants,
the colorant particles having an average particle diameter of 1 nm or more and less than 50 nm, and the value ($D_{90}$-$D_{10}$) of 100 nm or less,
wherein $D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.

Other and further features and advantages of the invention will appear more fully from the following description.

DETAILED DESCRIPTION OF THE INVENTION

Considering the requirements in industrial application, particularly the extremely severe requirements demanded recently for nonaqueous inks, conventional inks are still unsatisfactory. For example, further improvement of ink hardening velocity, hardening efficiency, and the like by photoirradiation is desired. In addition, pulverization of pigment fine particles for improvement in transparency was accompanied by a problem of deterioration in light resistance. Thus, it was difficult to obtain inks favorable in both of the transparency and the light resistance.

The present invention addresses the specific subject of the nonaqueous hardening inks, to provide a nonaqueous ink superior in hardening efficiency and ejecting stability, and further superior in a transparency of the formed image and an abrasion resistance thereof. Furthermore the present invention addresses to provide an image-recording method, an image-recording apparatus, and a recorded article by using the nonaqueous ink.

According to the present invention, there is provided the following means:

(1) A nonaqueous ink, comprising:
colorant particles, the colorant particles having an average particle diameter of 1 nm or more and less than 50 nm, and the value ($D_{90}$-$D_{10}$) of being 100 nm or less,
a dispersant; and
a radical-polymerization compound;
wherein $D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.

(2) The nonaqueous ink as described in the above item (1), wherein the colorant particle has a crystal structure.

(3) The nonaqueous ink as described in the above item (1) or (2), wherein the dispersant is a polymer compound.

(4) The nonaqueous ink as described in any one of the above items (1) to (3), further comprising a radical polymerization initiator.

(5) The nonaqueous ink as described in any one of the above items (1) to (4), wherein the radical-polymerization compound is a monofunctional radically polymerizable monomer containing only one ethylenic unsaturated group selected from the group consisting of an acrylate group, a methacrylate group, an acrylamide group, a methacrylamide group and a N-vinyl group.

(6) The nonaqueous ink as described in the above item (5), wherein the ink contains a monofunctional radically polymerizable monomer as the radical-polymerization compound in an amount of 65 mass % or more in the enter ink.

(7) The nonaqueous ink as described in any one of the above items (1) to (6), wherein the ink is an inkjet recording ink.

(8) An image-forming method, which comprises:
preparing a material for recording, the nonaqueous ink as described in any one of the above items (1) to (7), and an image-forming apparatus; and
recording an image of the recording liquid on the material with the image-forming apparatus.

(9) An image-forming apparatus, comprising:
a storage unit of the recording liquid as described in any one of the above items (1) to (7); and an image-forming unit;
whereby the recording liquid is recorded on a material with the image-forming unit.

(10) A recorded article comprising: the material for recording and the colorant particles formed on the material by using the nonaqueous ink as described in any one of the above items (1) to (7).

(11) A nonaqueous ink, comprising: a dispersant, a radical-polymerization compound, and colorant particles,
the colorant particles obtained by a precipitation process of bringing a colorant dissolved solution into contact with an aqueous medium, at least one of the colorant dissolved solution and the aqueous medium containing the dispersants,
the colorant particles having an average particle diameter of 1 nm or more and less than 50 nm, and the value ($D_{90}$-$D_{10}$) of 100 nm or less,
wherein $D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.

The nonaqueous ink (hereinafter, also referred to simply as "ink") according to the present invention is preferably an ink composition, containing colorant particles, a dispersant and a radical-polymerization compound. The ink composition can harden by irradiation of activating energy ray. The "activating energy ray", as used in the present invention, is not particularly limited, and may be any radiation ray that can impart energy for generation of initiators in the composition by irradiation thereof. Examples of the activating energy ray widely include α-ray, γ-ray, X-ray, ultraviolet ray (UV), visible ray, electron beam and the like; and among them, ultraviolet ray and electron beam are preferable, and ultraviolet ray is particularly preferable, from the viewpoint of hardening sensitivity and availability of devices. Thus, the nonaqueous ink according to the present invention is preferably an ink that can harden by irradiation of ultraviolet ray as a radiation ray.

The nonaqueous ink according to the present invention contains colorant particles, a dispersant, and a radical-polymerization compound, and the average particle diameter of the colorant particles is 1 nm or more and less than 50 nm, and the following value ($D_{90}$-$D_{10}$) is 100 nm or less.

[$D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function dG=F(D)dD; and G represents the number of the pigment particles; and D represents the diameter of the particles.]

In the nonaqueous ink according to the present invention, when the average particle diameter of the colorant particles is in the particular range above and the polydispersity index is less or equal to the particular numerical value, the ink is higher in the hardening velocity by crosslinking bond caused by an activating energy ray. Thereby, an image higher in transparency can be formed. In addition, combined use of the ink according to the present invention with other multiple inks gives an ink excellent in hardening efficiency and drastically higher in hardening velocity, which in turn gives a high-definition recorded article excellent in tint.

The reason for this may be, for example, the followings, although the reason is not yet to be clearly understood: Reduction in size of the colorant particles contained in an ink leads to decrease of the light-scattering component derived from the colorant particles and thus to increase of the ink transparency. It can be thought that this way reduces scattering of an activating energy ray used during image formation and uses the energy more efficiently for crosslinking and hardening of the ink. In particular, the colorant particles according to the present invention absorbs light very slightly in low wavelength region, as compared to conventional colorant particles, and thus, it can be thought that the energy of the activating ray can be more efficiently used for crosslinking and hardening of the ink.

When multiple inks are used for recording, because consumption of the activating ray energy and the amount of the scattering component are reduced in the ink according to the present invention containing colorant particles having the average particle diameter of 1 nm or more and less than 50 nm, the energy is transmitted to the other inks efficiently. As a result, it can be considered that, in a case where the ink according to the present invention is used in combination with multiple inks in an ink set, the ink set will be excellent in hardening velocity and hardening efficiency. The average particle diameter in the present invention means an average particle diameter determined by the following dynamic light-scattering method, unless specified otherwise, and measured by using FPAR-1000 (trade name) manufactured by Otsuka Electronics Co., Ltd. The average particle diameter of the colorant particles is more preferably 1 to 40 nm, from the viewpoint of improving ink hardening velocity when an activating ray is irradiated, and particularly preferably 1 to 30 nm from the viewpoint of further improving hardening velocity of the ink and improving transparency of the resulting recorded article.

If the average particle diameter is in this range, the recorded article hardens very rapidly when activating ray is irradiated, giving an image higher in transparency. If the ink is used in combination with multiple inks, further distinctive improvement in hardening efficiency is exhibited, giving a recorded article higher in fixing efficiency and abrasion resistance. Further, if the average particle diameter is below the range above, it is difficult to keep the dispersion state of the particles in the ink stabilized for a long period of time. It also leads to deterioration in light resistance. On the other hand, if it is above the range, it is not possible to obtain a recorded article excellent in transparency, and the hardening velocity and the hardening efficiency of the ink decrease.

[Average Particle Diameter Determined by Dynamic Light-Scattering Method]

In the present invention, the dispersion state of the colorant is evaluated by dynamic scattering method, as described above, and the average particle diameter of the colorant particles is calculated from the evaluation results, unless specified otherwise. The principle of the evaluation is detailed below. Particles with the size ranging from about 1 nm to about 5 μm are momentarily changing their position and direction in Brownian motion such as translation and rotation in liquid. Accordingly, by irradiating a laser light to these particles and then detecting the resultant scattered light, fluctuation of the scattered light intensity depending on Brownian motion is observed. By observing the fluctuation of the scattered light intensity with respect to time, a speed (diffusion coefficient) of the particles in Brownian motion is calculated and the size of the particles can be known.

[Average Particle Diameter from Observation by Transmission Electron Microscope]

In the present invention, a form of the colorant particles contained in an ink is observed by using a transmission electron microscope (TEM), to calculate an average particle diameter thereof as described below.

The colorant particles containing ink is diluted and dropped onto a Cu 200 mesh to which a carbon film is attached, and then the fine particles are dried on the mesh. The diameter of each of 300 particles is measured from images of the particles photographed to 100,000 times using TEM (1200 EX, manufactured by JEOL Ltd.), and then an average particle diameter is calculated.

At this time, because the ink is dried on the Cu 200 mesh as described above, even the colorant particles are in a state well dispersed in the ink, there is a case where the colorant particles apparently aggregate during the dry step, which makes it difficult to discriminate an accurate particle size. In this case, an average particle diameter is calculated by using isolated 300 particles that are not piled on other particles. When the colorants are not spherical, the width of the particle major axis (the longest size of the particle) is measured.

In the present invention, the arithmetic average particle diameter of the colorant particles in a dispersion medium, as determined by the dynamic light-scattering method, is preferably in the range of ±20 nm, more preferably in the range of ±15 nm, and still more preferably in the range of ±10 nm, from the average particle diameter determined by TEM observation. If it is in the range above, the colorant particles are well dispersed in the dispersion medium, and the advantageous effects of the present invention are exhibited sufficiently.

(Monodispersity of Colorant Particles)

In the present invention, a particle diameter distribution of the colorant particles dispersed in a dispersion medium is preferably monodispersion (narrow particle diameter distribution of the particles). When the colorant particles contained in an ink is in the monodispersion state, it is possible to reduce adverse influences such as light scattering caused by particles having a larger particle diameter, and use of such colorant particles is also advantageous in controlling filling state of aggregate formed by aggregation, for example, when printing or recording is made by aggregation using the ink. For example, the difference ($D_{90}$-$D_{10}$) between the particle diameter ($D_{90}$) occupying 90 number % of the total number of colorant particles and the particle diameter ($D_{10}$) occupying 10 number % of the total number of colorant particles, in the arithmetic average particle diameter as determined by dynamic light scattering method, can be used as an indicator for evaluation of ink dispersibility. In the relationship above, the difference between $D_{90}$ and $D_{10}$ is closer to zero when the particle diameter distribution is narrower, while the difference between $D_{90}$ and $D_{10}$ is larger when the particle diameter distribution is broader, i.e., the polydispersity is larger.

In the present invention, the difference between $D_{90}$ and $D_{10}$ is 100 nm or less, from the viewpoint of reduction of in the amount of the scattering component in printed area and increase of transparency. Further, the difference is more preferably 1 to 70 nm from the viewpoint of improvement in hardening velocity and hardening efficiency of the ink and particularly preferably 1 to 50 nm from the viewpoint of improvement of brilliant color development and printing concentration of secondary and tertiary colors and abrasion resistance. It should be noted that the above method can be suitably used in the particle diameter distribution curve that is prepared by using the particle diameter that is obtained from observation by using the above-described transmission electron microscope.

In particular, since the monodispersity of colorant particles described above largely contributes to reduce an absorption of radiation ray (light) in the low wavelength side of the colorant particles and the hardening velocity is very higher when the difference between $D_{90}$ and $D_{10}$ is in the range above. When the difference between $D_{90}$ and $D_{10}$ is more than the upper limit value, the scattering component in the ink solution is increased, leading to deterioration in hardening velocity and hardening efficiency of a recorded article. In the present invention, as a result of combining that the monodispersity of the colorant particles is in the range above and that the average particle diameter of the colorant particles is 1 nm or more and less than 50 nm, it is possible to obtain particularly distinctive improvement in the well transparency and the ink hardening velocity described above.

The phrase "the colorant particle has a crystalline structure" used in the present invention means that when the colorant particles contained in an ink are subjected to a powder X-ray diffraction analysis, the results of analysis do not meet any one of the following (i) and (ii):

(i) A halo that is specific to amorphous (non-crystalline) substance is observed.

(ii) The crystallite diameter that is determined by the measuring method described below is less than 2 nm (20 Å), or the substance is supposed to be amorphous.

In the present invention, the crystallite diameter is measured and calculated as follows:

First, X-ray diffraction analysis is performed by using Cu—Kα1 ray. Thereafter, in the 2θ range of 4 degrees to 70 degrees, a half width of a peak that shows the maximum intensity or a peak that has a sufficiently large intensity and can be discriminated from a peak(s) adjacent thereto, is measured. Then, the crystallite diameter is calculated according to the following Scherrer's equation:

$$D = K \times \lambda / (\beta \times \cos \theta)$$

wherein D represents a crystallite diameter (m, a size of crystallite), λ represents a measuring X-ray wavelength (nm), β represents an extent (radian) of a diffraction line dependent on a diameter of the crystal, θ represents a Bragg angle (radian) of the diffraction line, and K represents a constant which is variable depending on the constant of β and D.

Generally, it is known that when a half width β/2 is used in place of β, K equals 0.9. Further, since the wavelength of Cu—Kα1 ray is 0.154050 nm (1.54050 Å), the crystallite diameter D (nm) in the present invention is calculated according to the following equation:

$$D = 0.9 \times 1.54050 / (\beta/2 \times \cos \theta)$$

In this case, when a peak of the spectrum obtained by the measurement is so broad that a half width of the peak is difficult to make out, it is assumed that the crystallite diameter is less than 2 nm (20 Å) (fine crystalline state) or the substance is in an amorphous state (non-crystalline).

In the ink according to the present invention, the crystallite diameter of the colorant particles contained in the ink, as calculated by the method above, is preferably 0.9 nm (9 Å) or more from the viewpoint of improvement in light resistance, more preferably 5 nm (50 Å) or more and particularly preferably 8 nm (80 Å) or more from the viewpoint of further improvement in light resistance and preservation of transparency. The upper limit of the crystallite diameter is not larger than the average particle diameter calculated by TEM observation (or SEM observation).

If a large amount of amorphous portion is contained in the ink, an active surface is increased, which in turn may result in a radical-polymerization ink deteriorated in hardening efficiency or storage stability by polymerization inhibition caused by oxygen.

As for the ink according to the present invention, bulky particles or gross secondary aggregates (aggregates of primary particles) are preferably contained in a smaller amount in each ink. The number of the colorant particles having a particle diameter of 0.8 μm or more in the colorant particles contained in each ink is $1.2 \times 10^7$ number/ml or less, preferably $1.0 \times 10^7$ number/ml or less, from the viewpoint of abrasion resistance and particularly preferably $0.8 \times 10^7$ number/ml or less from the viewpoint of improvement of ejecting stability and hardening velocity.

In the present invention, the average diameter and the value represented by ($D_{90} - D_{10}$) are values measured by the methods described in the Examples described below, unless specified otherwise. The number of the colorant particles having a particle diameter of 0.8 μm or more is determined by measuring the number of bulky particles having a particle diameter of 0.8 μm or more in a particular area of a film formed to a thickness of 3 μm by bar coating of an ink under optical microscope at a magnification of 5,000 times and converting the value to a value per 1 ml of an ink. The average particle diameter of the colorant particles according to the present invention can be controlled by selecting kinds of pigment, dispersant and dispersion condition, and the number of the bulky particles can be controlled properly adjustment of filtration condition (for example, selection of a filter, and presence or absence of multi-stage filtration, centrifugation, or the like).

In addition, the nonaqueous ink according to the present invention allows drastic reduction of the amount of a filler used in forming aggregates, for example, for printing, recording by using the ink, and also diversification of the freedom of choice thereof and is thus more advantageous than conventional inks. The ink also shows a clear transparent brilliant color characteristic of nanometer-sized colorant particles. The ink that satisfies the current high requirement level can be used favorably as a colorant for advanced precision image-related devices such as color filter or a high-performance inkjet ink.

The colorant constituting the colorant particles according to the present invention is not particularly limited and may be suitably selected according to application. Examples of the organic pigment used as colorant include an azo pigment, a polycyclic pigment, a dye chelate, a nitro pigment, a nitroso pigment, and aniline black. Among them, an azo pigment, a polycyclic pigment and the like are preferable.

Examples of the azo pigment include an azo lake, an insoluble azo pigment, a condensed azo pigment, and a chelate azo pigment. Examples of the polycyclic pigment include a phthalocyanine pigment, a perylene pigment, a perynon pigment, an anthraquinone pigment, a quinacridone pigment, a dioxazine pigment, an indigo pigment, a thioindigo pigment, an isoindolinone pigment, and a quinophlalone pigment. Examples of the dye chelate include a basic dye type chelate and an acidic dye type chelate.

The organic pigment includes, for example, C.I. Pigment yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180 as a pigment of a yellow ink. Among them, C.I. Pigment yellow 74 is particularly preferable. The organic pigment includes, for example, C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (Bengala), 104, 105, 106, 108 (Cadmium Red), 112, 114, 122 (Quinacridone Magenta), 123, 146, 149, 163, 166, 168, 170, 172, 177, 178, 179, 184, 185, 190, 193, 202, 209, 219, 269, and C.I. Pigment Violet 19 as a pigment of a magenta ink. Among them, C.I. Pigment Red 122 is particularly preferable. The organic pigment includes, for example, C.I. Pigment Blue 1, 2, 3, 15, 15:1, 15:2, 15:3, 15:34, 16, 17:1, 22, 25, 56, 60, C.I. Bat Blue 4, 60, 63 as a pigment of a cyan ink. Among them, C.I. Pigment Blue 15:3 is particularly preferable.

Examples of the inorganic pigment include, for example, titanium oxide, iron oxide, calcium carbonate, barium sulfate, aluminum hydroxide, barium yellow, cadmium red, chromium yellow, carbon black. Among them, carbon black is particularly preferable. Examples of the carbon black include those produced by a known method such as contact method, furnace method, or thermal method.

Specific examples of a carbon black as a black series organic pigment Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060, and Raven 700 (all manufactured by Columbian Carbon); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corporation); Color Black FW1, Color Black FW2, Color Black FW2V, Color Black 18, Color Black FW200, Color Black S150, Color Black S160, Color Black S170, Printex35, Printex U, Printex V, Printex 140U, Printex 140V, Special Black 6, Special Black 5, Special Black 4A, and Special Black 4 (all manufactured by Degussa, Japan); No. 25, No. 33, No. 40, No. 45, No. 47, No. 52, No. 900, No. 2200B, No. 2300, MCF-88, MA600, MA7, MA8, and MA100 (all manufactured by Mitsubishi Chemical Corporation). However, the black series organic pigment is not limited thereto.

The colorant may be used alone or in combination of multiple colorants, as selected from the group or the groups described above, and the colorant may be a solid solution pigment consisting of two or more pigments.

The content of the colorant in the nonaqueous ink according to the present invention is not particularly limited, but preferably 2 mass % or more, more preferably 2 to 8 mass %, and still more preferably 3 to 6 mass %. It is possible, when the content is in the range above, to obtain an ink further superior both in printing efficiency and storage stability and further to improve the hardening efficiency by an activating energy ray.

The colorant particle according to the present invention is not particularly limited, but preferably, colorant particles produced by preparing a solution in which the colorant is dissolved and an aqueous medium, and bringing the solutions and the aqueous medium into contact with each other for precipitation (hereinafter, referred to as built-up fine particles) are used. The colorant fine particles thus obtained have very small primary particle diameter and are readily dispersed. In addition, the particles do no demand excessive pulverization energy during the dispersion treatment and generate a smaller area of active surface by pulverization of the colorant particles in the dispersion process, and thus, when used in the ink according to the present invention, can reduce deterioration in hardening efficiency due to polymerization inhibition.

In particular, it is thought that when the colorant particles are fine in the monodispersion state, the filling factor of the colorant particles in the printed area is often increased, and the thickness of the printed area is made thin. Reduction in thickness of the printed area may lead to increased polymerization inhibition by oxygen, but, when colorant particles obtained in the following way, which are fine in the monodispersion state and thus readily dispersible, are used, the deterioration in hardening efficiency is suppressed more distinctively.

Preferably in production of the built-up fine particles in the present invention, at least one of the solution in which the colorant is dissolved and the aqueous medium contains a dispersant (first dispersant). A more preferable embodiment will be described below.

A method of producing the colorant particles, which comprises: (1) a step of dissolving a water-insoluble colorant (organic pigment) together with the first dispersant (dispersing agent) in an aprotic water-insoluble organic solvent in the presence of alkali, to prepare a solution thereof; (2) a step of preparing a dispersion by mixing the resultant solution with an aqueous medium, in which particles of the water-insoluble colorant and the first dispersing agent are dispersed in a medium containing water. Further the method may employ: (3) a step of aggregating the particles of the water-insoluble colorant into redispersible agglomerates (flocks), separating the agglomerates from the medium, and (4) a step of redispersing the agglomerates to form fine particles redispersed in a redispersion medium. For improvement in crystallinity of the water-insoluble colorant, (5) a step of bringing the agglomerates into contact with an ester-based solvent, a ketone-based solvent or an alcoholic solvent and (6) a step of heat-treating the agglomerates may be adopted. A second dispersant different from or identical with the first dispersant is preferably added in the steps (3) to (6). If the medium is switched to a nonaqueous medium, a dispersant having dispersibility in the medium is preferably used. Considering these points, the first dispersant may be referred to as "aqueous dispersant" and the second dispersant as "nonaqueous dispersant". In the step (1), a pigment derivative may be dissolved in the colorant solution or the aqueous medium. The amount of the pigment derivative added is preferably 50% or less by mass, more preferably 5% or more and 30% or less, and particularly preferably 7% or more and 15% or less, with respect to the colorant from the viewpoint of stability of the pigment particles. The nonaqueous dispersion or the nonaqueous ink in the present invention means a dispersion or an ink not containing water as a main medium. The water content is preferably reduced to less than 10 mass %, from the viewpoint of prevention of deterioration of long-term storage stability of ink and troubles such as blurring and color bleeding, and it is more preferably reduced to less than 5 mass % from the viewpoint of prevention of deterioration in photohardening velocity of ink and mechanical strength of the hardened film.

The aprotic solvent preferably for use is a solvent having a solubility of 5 mass % or more in water, and a solvent freely miscible with water is more preferable. Specifically, preferable examples of the solvent include dimethylsulfoxide, dimethylimidazolidinone, sulfolane, N-methylpyrrolidone, N,N-dimethylformamide, acetonitrile, acetone, dioxane, tetramethylurea, hexamethylphosphoramide, hexamethylphosphoro triamide, pyridine, propionitrile, butanone, cyclohexanone, tetrahydrofuran, tetrahydropyran, ethyleneglycol diacetate, and γ-butyrolactone. Of these solvents, dimethylsulfoxide, N-methylpyrrolidone, N,N-dimethylformamide, dimethylimidazolidinone, sulfolane, acetone, acetonitrile, and tetrahydrofuran are preferable. Further, these solvents may be used singly or in a combination thereof. A proportion of the aprotic solvent to be used is not particularly limited.

However, it is preferred to use the solvent in the proportion of 2 parts by mass to 500 parts by mass, more preferably from 5 parts by mass to 100 parts by mass, with respect to 1 part by mass of the colorant respectively, in order to improve a dissolution state of the colorant, to form easily a colorant having a desired fine particle diameter, and to improve a color density of aqueous dispersion.

Examples of the alkali that can be contained in the above aprotic solvents include inorganic bases such as sodium hydroxide, calcium hydroxide, and barium hydroxide; and organic bases such as trialkylamine, diazabicycloundecene (DBU), and metal alkoxides. Among these, the inorganic bases are preferably used. These can be properly used depending on the purpose of dissolving the colorant or dispersant.

The amount of the base to be used is not particularly limited. In the case of the inorganic base, the amount thereof is preferably from 1.0 to 30 mole equivalents, more preferably from 2.0 to 25 mole equivalents, and particularly preferably from 3 to 20 mole equivalents, to the colorant. In the case of the organic base, the amount thereof is preferably from 1.0 to 100 mole equivalents, more preferably from 5.0 to 100 mole equivalents, and particularly preferably from 20 to 100 mole equivalents, to the colorant.

In the present invention, the "aqueous medium" refers to water alone, or a mixed solvent of water and an organic solvent soluble in water. The addition of the organic solvent is preferably used, for example, (i) in the case where only water is not sufficient for uniformly dissolving a colorant and a dispersing agent, (ii) in the case where only water is not sufficient for obtaining viscosity required for the flow through a flow path, and the like. In the case of alkaline, for example, the organic solvent is preferably an amide series solvent or a sulfur-containing-series solvent, more preferably the sulfur-containing-series solvent, and particularly preferably dimethylsulfoxide (DMSO). In the case of acidic, the organic solvent is preferably a carboxylic acid series solvent, a sulfur-containing-series solvent or a sulfonic acid series solvent, more preferably a sulfonic acid series solvent, and particularly preferably methanesulfonic acid. Additionally, an inorganic compound salt, a dispersing agent as described below or the like may be dissolved into the aqueous medium as required.

In this case, the embodiment wherein a solution of a colorant homogeneously dissolved therein and an aqueous medium are mixed is not particularly limited. Examples of the embodiment include an embodiment in which a water-insoluble colorant solution is added to an aqueous medium with being stirred, and an embodiment in which a water-insoluble colorant solution and an aqueous medium are each delivered to a certain length of flow path in the same longitudinal direction, and both the solution and the medium contact with each other in the course of getting through the flow path, thereby to deposit fine particles of the colorant. With respect to the former (the embodiment of stirring and mixing), it is especially preferred to use an embodiment in which a feed pipe or the like is introduced in an aqueous medium so that a water-insoluble colorant solution is fed from the pipe for addition in liquid. More specifically, the addition in liquid can be performed by using an apparatus described in Paragraph Nos. 0036 to 0047 of International Publication WO 2006/121018 pamphlet. With respect to the latter (the embodiment of mixing both the solution and the medium by using the flow path), there can be used micro reactors described in Paragraph Nos. 0049 to 0052 and FIGS. 1 to 4 of JP-A-2005-307154, and Paragraph Nos. 0044 to 0050 of JP-A-2006-78637.

A condition for precipitation and formation of the colorant particles is not particularly limited, and can be selected from a range from a normal pressure condition to a subcritical or supercritical condition. The temperature at which the particles are prepared under normal pressure is preferably −30 to 100° C., more preferably −10 to 60° C., and particularly preferably 0 to 30° C. A mixing ratio of the colorant solution to the aqueous medium is preferably 1/50 to 2/3, more preferably 1/40 to 1/2, and particularly preferably 1/20 to 3/8 in volume ratio. The concentration of the particles in the mixed liquid at the time of precipitation of the colorant particles is not particularly limited, but the amount of the colorant particles is preferably 10 to 40,000 mg, more preferably 20 to 30,000 mg, and particularly preferably 50 to 25,000 mg, per 1,000 ml of the solvent.

It is also preferable to heat the liquid mixture. As a result, crystallization of the colorant such as pigment (formation of strong crystal) is improved, and the ink prepared by using such a dispersion liquid is improved in stability and particularly distinctively in weather resistance of the recorded image. The heating temperature is preferably 50 to 120° C. and more preferably 80 to 100° C. The period of time of heat treatment is preferably 10 minutes to 3 days, more preferably 1 hour to 1 day, and still more preferably 1 to 6 hours. Excessively high heating temperature and elongation of the heating time may lead to excessive growth of the particles and are thus unfavorable. The liquid may be left still or agitated during the heating.

In preparation of the built-up fine particles, the first dispersant for use may be favorably a dispersant soluble in an aprotic organic solvent in the presence of alkali that shows its dispersion effect by forming colorant-containing particles in the aqueous medium when a solution of a water-insoluble colorant and the dispersant and the aqueous medium are mixed. It is preferable to use a surfactant or polymer compound, having at least one hydrophilic component selected from the group consisting of a carboxylic acid group, a sulfonic acid group, a phosphoric acid group, a hydroxyl group, and an alkyleneoxide group. More preferable dispersing agent is a compound that can dissolve stably together with organic pigments in an aprotic organic solvent in the presence of alkali. When a hydrophilic component of the dispersing agent is composed of only other group(s) than the above groups, such as a primary, secondary, or tertiary amino group and a quaternary ammonium group, a dispersion property is sufficient in an alkali-containing aqueous dispersion of an organic pigment. However, a degree of dispersion stability is sometimes relatively small.

Preferable examples of the polymer dispersing agent as a first dispersant include polyvinyl pyrrolidone, polyvinyl alcohol, polyvinyl methyl ether, polyethylene oxide, polyethylene glycol, polypropylene glycol, polyacrylamide Specific examples of the polymer dispersant used as an other dispersan(s) include block-copolymers, random copolymers, or graft copolymers, or modified materials of these copolymers and salts thereof, each of which is composed of at least two monomers selected from styrene, styrene derivative, vinylnaphthalene, vinylnaphthalene derivative, aliphatic alcohol esters of α,β-ethylenically unsaturated carboxylic acid, acrylic acid, acrylic acid derivative, methacrylic acid, methacrylic acid derivative, maleic acid, maleic acid derivative, alkenyl sulfonic acids, vinyl amines, allyl amines, itaconic acid, itaconic acid derivative, fumaric acid, fumaric acid derivative, vinyl acetate, vinyl phosphoric acid, vinyl pyrrolidone, acrylamide, N-vinyl acetoamide, N-vinylformamide, and derivative compounds thereof, with the proviso that at least one of said at least two monomers is a monomer having a functional group becoming a carboxylic acid group, a sulfonic acid group, a phosphoric acid group, an hydroxyl group, or an alkyleneoxide.

Further, as a polymer compound that can be used as an other dispersing agent(s), use can be preferably made of natural polymer compounds, such as albumin, gelatin, rosin, shellac, starch, gum Arabic, and sodium alginate; and their modified compounds. Further, these dispersing agents may be used singly, or in a combination of two or more.

The content of the first dispersant is not particularly limited, but, preferably 0.05 part by mass or more with respect to 1 part by mass of a colorant and in the range of 50 parts by mass or less with respect to 100 parts by mass of the aprotic organic solvent. If the content of the dispersant is equal to or less than the upper limit with respect to 100 parts by mass of the aprotic organic solvent, the dispersibility of the dispersant in the colorant solution or in the aqueous medium is improved and the dispersibility when the colorant particles are precipitated is distinctively improved, and, if the content of the dispersant is not less than the lower limit, the stability of the dispersibility is improved distinctively.

The dispersant contained in the nonaqueous ink according to the present invention may be the first dispersant described above, a mixture of the first dispersant with the second dispersant, or the other second dispersant. The first and second dispersants may be the same as or different from each other, but the second dispersant is preferable a nonaqueous dispersant, and examples thereof include the followings.

The polymer dispersants include DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie); EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575, and EFKA7580 (all manufactured by EFKA Additives); polymer dispersant such as Disperse Aid 6, Disperse Aid 8, Disperse Aid 15, and Disperse Aid 9100 (all manufactured by SAN NOPCO LIMITED); various solsperse dispersants such as Solsperse 3000, 5000, 9000, 12000, 13240, 13940, 17000, 24000, 26000, 28000, 32000, 36000, 39000, 41000 and 71000 (all manufactured by Abisia); Adeka Pluronic L31, F38, L42, L44, L61, L64, F68, L72, P95, F77, P84, F87, P94, L101, P103, F108, L121, and P-123 (manufactured by ADEKA CORPORATION); Isonet S-20 (manufactured by Sanyo Chemical Industries); and "Disparlon KS-860, 873SN and 874 (polymer dispersants), #2150 (aliphatic polyvalent carboxylic acid), #7004 (polyether ester type)," manufactured by Kusumoto Chemicals, Ltd. Further, a pigment derivative such as a phthalocyanine derivative (trade name: EFKA-745 (manufactured by EFKA)), Solsperse 5000, 12000 or Solsperse 22000 (manufactured by Abisia) can also be used in combination. (All of the above are trade names.)

Examples of the surfactant that can be used as the dispersant or together with the dispersant include those described in JP-A-62-173463 and JP-A-62-183457. Specific examples thereof include anionic surfactants, such as a dialkylsulfosuccinate salt compound, an alkylnaphthalenesulfonate salt compound, and a fatty acid salt compound; nonionic surfactants, such as a polyoxyethylene alkyl ether compound, a polyoxyethylene alkyl allyl ether compound, an acetylene glycol compound, and a polyoxyethylene/polyoxypropylene block copolymer compound; and cationic surfactants, such as an alkylamine salt compound and a quaternary ammonium salt compound. An organofluoro compound may be used in place of the above-described surfactant. The organofluoro compound is preferably hydrophobic. Examples of the organofluoro compound include a fluorine-containing surfactant, an oily fluorine-containing compound (e.g., fluorine oil), and a solid state fluorine-containing compound resin (e.g., tetrafluoroethylene resin). Examples of the organofluoro compound are described, for example, in JP-B-57-9053 ("JP-B" means examined Japanese patent publication) (columns from 8 to 17), and JP-A-62-135826.

Specifically, the surfactant that can be used in the present invention may be properly selected from previously known surfactants and derivatives thereof, including anionic surfactants such as alkylbenzene sulfonic acid salts, alkylnaphthalene sulfonic acid salts, higher fatty acid salts, sulfonic acid salts of higher fatty acid esters, sulfuric acid ester salts of higher alcohol ether, sulfonic acid salts of higher alcohol ether, alkylcarboxylic acid salts of higher alkylsulfonamide, and alkylphosphoric acid salts; nonionic surfactants such as polyoxyethylene alkylethers, polyoxyethylene alkylphenylethers, polyoxyethylene fatty acid esters, sorbitan fatty acid esters, ethyleneoxide adducts of acetylene glycol, ethyleneoxide adducts of glycerin, and polyoxyethylene sorbitan fatty acid esters; and in addition to the above, amphoteric surfactants such as alkyl betaines and amido betaines; and silicone-based surfactants and fluorine-based surfactants.

As the surfactant above, a compound having a structure in which a hydrophilic moiety and a hydrophobic moiety are included in a molecule can be effectively used. Any of an anionic surfactant, a cationic surfactant, an amphoteric surfactant, and a nonionic surfactant can be used.

Examples of the anionic surfactant include sodium dodecylbenzene sulfonate, sodium lauryl sulfate, a sodium alkyl diphenyl ether disulfonate, a sodium alkylnaphthalene sulfonate, a sodium dialkyl sulfosuccinate, a sodium stearate, a potassium oleate, a sodium dioctylsulfosuccinate, a sodium polyoxyethylene alkyl ether sulfate, a sodium polyoxyethylene alkyl ether sulfate, a sodium polyoxyethylene alkylphenyl ether sulfate, sodium dialkylsulfosuccinate, sodium stearate, sodium oleate, and sodium t-octylphenoxyethoxypolyethoxyethyl sulfate. The anionic surfactant may be used singly, or in combination of two or more thereof.

Examples of the nonionic surfactant include polyoxyethylene lauryl ether, polyoxyethylene octyl phenyl ether, polyoxyethylene oleyl phenyl ether, polyoxyethylene nonyl phenyl ether, an oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of the cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

When a polymer dispersant is used as a dispersant contained in ink, the polymer dispersant having a mass-average molecular weight of 2,000 to 60,000 is preferable. It should be noted that when described simply as a molecular mass in the present invention, the molecular mass means mass average molecular mass, and the mass average molecular mass, unless otherwise specified, means an average molecular mass calculated in terms of polystyrene that is measured by gel permeation chromatography (carrier: tetrahydrofuran).

The amount of the dispersant contained in ink is preferably in the range of 10% or more and 100% or less, more preferably 20% or more and 70% or less, particularly preferably 40% or more and 50% or less by mass ratio with respect to the colorant. It is possible to keep well polymerization reaction of the copresent radical-polymerization compound, to exhibit dispersion stability of the colorant, and to bring out extremely favorable interactions between the components in ink, by adjusting the dispersant content in the range above.

In the dispersion of the nonaqueous ink according to the present invention, it is preferable to treat the liquid mixture containing precipitated colorant particles with acid, to treat the dispersion preferably by adding an acid to the liquid mixture when forming aggregates, thereby to form particle aggregates. The acid-using treatment preferably includes steps of aggregating the particles with an acid, separation of the resultant aggregate from a solvent (dispersing medium), concentration, solvent removal and desalting (deacidification). By making a system acidic, it enables to reduce electrostatic repulsion of particles owing to a hydrophilic portion of the acid, and to aggregate the particles.

As the acid that is used in the aggregation of particles, any acid may be used so long as the compound is able to make hardly precipitating fine-particles in the aqueous dispersion aggregate in a form such as slurry, paste, powder-like, granular, cake-like (bulk), sheet-like, short (discontinuous) fiberlike or flake-like form, and able to efficiently separate the resultant aggregate from a solvent according to an ordinary separation method. As the acid, it is preferred to use an acid that forms a water-soluble salt with alkali. It is more preferable that the acid itself has a high solubility to water. In order to conduct desalting as efficiently as possible, it is preferable that the amount of acid used is as small as possible so long as the particles aggregate in the amount of the acid. Examples of the acid include hydrochloric acid, sulfuric acid, nitric acid, acetic acid, phosphoric acid, trifluoroacetic acid, dichloroacetic acid, and methane sulfonic acid. Of these acids, hydrochloric acid, acetic acid, and sulfuric acid are particularly preferable. An aqueous dispersion of colorant particles that has been processed with the acid so as to be easily separable can be easily separated by using a centrifugal separator, a filter, a slurry liquid-solid separator or the like. At this time, a degree of desalting or solvent removal can be controlled by adding diluent water, or by increasing frequency of decantation and washing with water.

In order to remove water and water-soluble solvent in which the thus-obtained aggregate cannot be dissolved, if necessary, it is also possible to use fine powder that is obtained by drying the paste or slurry according to a drying method such as a spray-dry method, centrifugal separation drying method, a filter drying method, or a freeze-drying method.

In the dispersion of the ink of the present invention, a colorant preferably has a crystalline structure. It is preferable that the agglomerate is brought into contact with an organic solvent, in order to form the crystalline structure. As the organic solvent, ester series solvents, ketone series solvents, alcoholic solvents, aromatic solvents and aliphatic solvents are preferable. Ester series solvents and ketone series solvents are more preferable. Ester series solvents are especially preferable. Examples of the ester series solvents include ethyl acetate, ethyl lactate, and 2-(1-methoxy) propyl acetate. Examples of the ketone series solvents include acetone, methyl ethyl ketone, methyl isobutyl ketone, and cyclohexanone. Examples of the alcoholic solvents include methanol, ethanol, and n-butanol. Examples of the aromatic solvents include benzene, toluene, and xylene. Examples of the aliphatic solvents include n-hexane and cyclohexane. Among them, methanol, ethyl acetate, acetone, and ethyl lactate are preferable, and acetone and ethyl lactate are particularly preferable.

The amount of the organic solvent used is not particularly limited, but, for example, it is preferred to use the organic solvent in the proportion of 0.01 part by mass to 10,000 parts by mass with respect to 100 parts by mass of the colorant. The amount of the organic solvent that is contained in the dispersion of the ink of the present invention is not particularly limited, but it is practical that the proportion of the organic solvent is in the range of 0.0001% by mass to 1% by mass.

The method of bringing the obtained aggregates into contact with the organic solvent described above is not particularly limited, but a method allowing separation of the aggregates from the organic solvent after contact is preferable. A method allowing separation of the organic solvent in a state of a liquid, such as decantation or filter filtration, is more preferable.

Although the reason is not clear, it is possible to increase crystallite diameter without increasing the particle diameter of the colorant particles contained in the dispersion by the contact treatment with an organic solvent. It is thus possible to increase the crystallinity of the colorant particles, while the primary particle diameter during precipitation of the particles is preserved. In addition, in the redispersion treatment described below, it is possible to redisperse the aggregate into a medium while the primary particle diameter during precipitation of the particles is preserved and to also preserve a dispersion having high dispersion stability. Also by conducting the treatment, viscosity of the aggregate redispersion remains low, even when the aggregate dispersion is highly concentrated. It further shows favorable ejecting efficiency, when used as an inkjet recording liquid. These actions are probably exhibited because the excessive dispersant contained in the dispersion is released and removed by bringing the dispersion into contact with the organic solvent and then separating the dispersion from the organic solvent.

Because the dispersant present close to the surface of the colorant particles in the dispersion is bound tightly to the colorant particles, the particles are kept at high dispersion stability even after redispersion treatment described below without increasing the particle diameter of the colorant particles, while the primary particle diameter during precipitation of the particles is preserved.

In addition, the agglomerate in the present invention can be dispersed easily without need for large energy during dispersion in a medium. Although the reason is not clear, it seems that aggregation of the colorant particles are less easily tightened, because the portion of the colorant itself exposed on the surface of the colorant particles according to the present invention is small.

In the present invention, the second dispersant described above is used favorably, when the aggregate particles are redispersed. As a mean for a dispersion treatment, means that are known from the past may be used. For example, it is possible to use a dispersing machine such as sand mill, bead mill, ball mill, and Dissolver, or an ultrasonic treatment depending on the necessity.

At this time, a mixture in paste or slurry state, which is prepared by previously adding a compound constituting the dispersion medium, a dispersant and additionally a compound assisting dispersion into the dispersion medium to the aggregated particles, may be used. Further, heating, cooling, distillation or the like may be conducted for the purpose of enhancing efficiency of re-dispersion and another purpose of removing water, water-soluble organic solvents, or the like.

The radical-polymerization compound contained in the nonaqueous ink according to the present invention is not particularly limited, and a common radical-polymerization compound may be used. As the radically polymerizable compounds, photocurable materials employing a photopolymerizable composition described in JP-A-7-159983, JP-B-7-31399, JP-A-8-224982, JP-A-10-863, JP-A-9-80675, and the like. are known. The radical-polymerization compound is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer. One type of radically polymerizable compound may be used, or two or more types thereof may be used at any ratio in combination in order to improve an intended property.

Preferable examples of the radical-polymerization compounds that can be used in the present invention include a radically polymerizable monomer having an ethylenic unsaturated double bond group selected from the group consisting of an acrylate group, a methacrylate group, an acrylamide group, and an N-vinyl group. Preferred examples of the radical-polymerization compound that can be used in the present invention include a monofunctional radically polymerizable monomer containing only one ethylenically unsaturated double bond group selected from the group consisting of an acrylate group, a methacrylate group, an acrylamide group, and an N-vinyl group, and the content of the monofunctional radically polymerizable monomer in the composition is preferably at least 65 mass %.

Preferred examples of the radical-polymerization compound that can be used in the present invention include N-vinyl group-containing cyclic monomers; it is more preferable to use an N-vinylcarbazole, a 1-vinylimidazole, or N-vinyllactams, and it is yet more preferable to use N-vinyllactams. Preferred examples of the N-vinyllactams that can be used in the present invention include compounds represented by the formula (I) below.

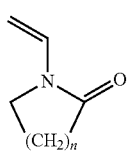
(I)

In the formula (I), n denotes an integer of 1 to 5; n is preferably an integer of 2 to 4 from the viewpoints of flexibility after the ink composition is cured, adhesion to a recording medium, and starting material availability, n is more preferably 2 or 4, and n is particularly preferably 4, which is N-vinylcaprolactam. N-Vinylcaprolactam is preferable since it has excellent safety, is commonly used and easily available at a relatively low price, and gives particularly good ink curability and adhesion of a cured film to a recording medium. The N-vinyllactams may have a substituent such as an alkyl group or an aryl group on the lactam ring, and may have a saturated or unsaturated ring structure bonded thereto. As the N-vinyllactams are compounds having a relatively high melting point, when the N-vinyllactams are used, it is preferable for the content of the N-vinyllactams to be no greater than 40 mass % in the ink composition or the surface coating composition respectively since good solubility is exhibited even at a low temperature of 0° C. or less and the temperature range in which the ink composition can be handled becomes large.

Preferred examples of the radical-polymerization compound that can be used in the present invention include cyclic monomers having an acrylate group, a methacrylate group, an acrylamide group, a methacrylamide group, and/or a vinyl ether group, and more preferred examples thereof include cyclic monomers having an acrylate group, a methacrylate group, an acrylamide group, and/or a methacrylamide group. Examples of the cyclic monomers include monomers having an aromatic group such as a phenyl group, a naphthyl group, an anthracenyl group, or a pyridinyl group, a heterocyclic group such as a tetrahydrofurfuryl group or a piperidinyl group, or a hydrocarbon cyclic group such as a cyclohexyl group, a cyclopentyl group, a cycloheptyl group, an isobornyl group, or a tricyclodecanyl group.

Preferred examples of the cyclic monomers having an acrylate group, a methacrylate group, and/or an acrylamide group include norbornyl (meth)acrylate, isobornyl (meth)acrylate, cyclohexyl (meth)acrylate, cyclopentyl (meth)acrylate, cycloheptyl (meth)acrylate, cyclooctyl (meth)acrylate, cyclodecyl (meth)acrylate, dicyclodecyl (meth)acrylate, trimethylcyclohexyl (meth)acrylate, 4-t-butylcyclohexyl (meth)acrylate, acryloylmorpholine, 2-benzyl (meth)acrylate, phenoxyethyl (meth)acrylate, phenoxydiethylene glycol (meth)acrylate, phenoxytriethylene glycol (meth)acrylate, EO-modified cresol (meth)acrylate, tetrahydrofurfuryl (meth)acrylate, caprolactone-modified tetrahydrofurfuryl acrylate, nonylphenoxy polyethylene glycol (meth)acrylate, neopentyl glycol benzoate (meth)acrylate, paracumylphenoxy ethylene glycol (meth)acrylate, N-phthalimidoethyl (meth)acrylate, pentamethylpiperidyl (meth)acrylate, tetramethylpiperidyl (meth)acrylate, N-cyclohexylacrylamide, N-(1,1-dimethyl-2-phenyl)ethylacrylamide, N-diphenylmethylacrylamide, N-phthalimidomethylacrylamide, N-(1,1'-dimethyl-3-(1,2,4-triazol-1-yl))propylacrylamide, and 5-(meth)acryloyloxymethyl-5-ethyl-1,3-dioxacyclohexane.

Furthermore, preferred examples of the cyclic monomers having an acrylate group, a methacrylate group, an acrylamide group, a methacrylamide group, and/or a vinyl ether group include (M-1) to (M-29) shown below. Some of chemical formulae shown below are expressed as simplified structural formulae in which symbols for carbon (C) and hydrogen (H) of a hydrocarbon chain are omitted.

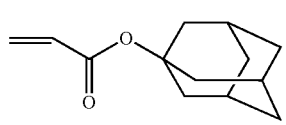
(M-1)

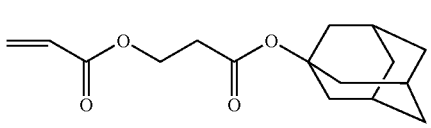
(M-2)

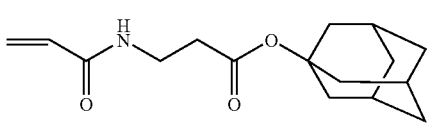
(M-3)

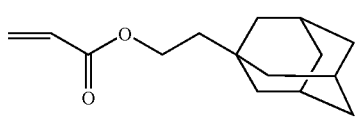
(M-4)

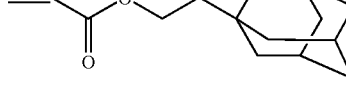
(M-5)

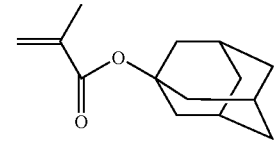
(M-6)

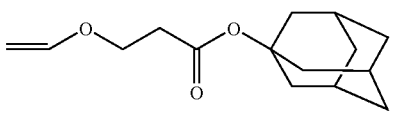
(M-7)

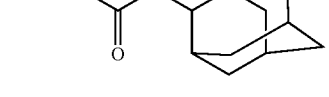
(M-8)

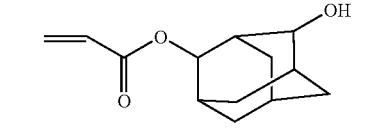
(M-9)

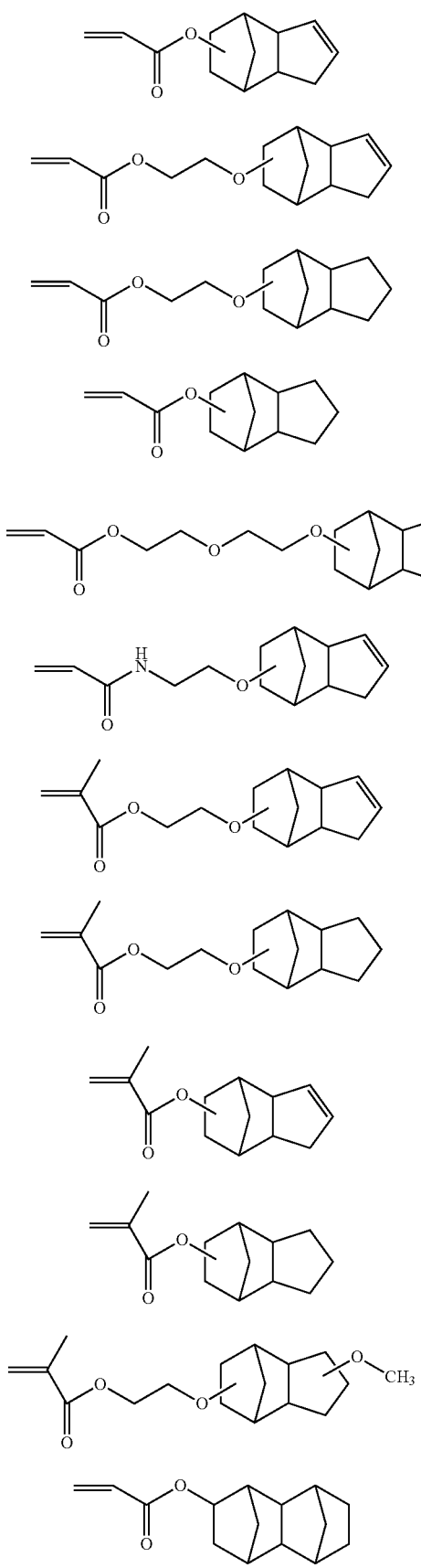
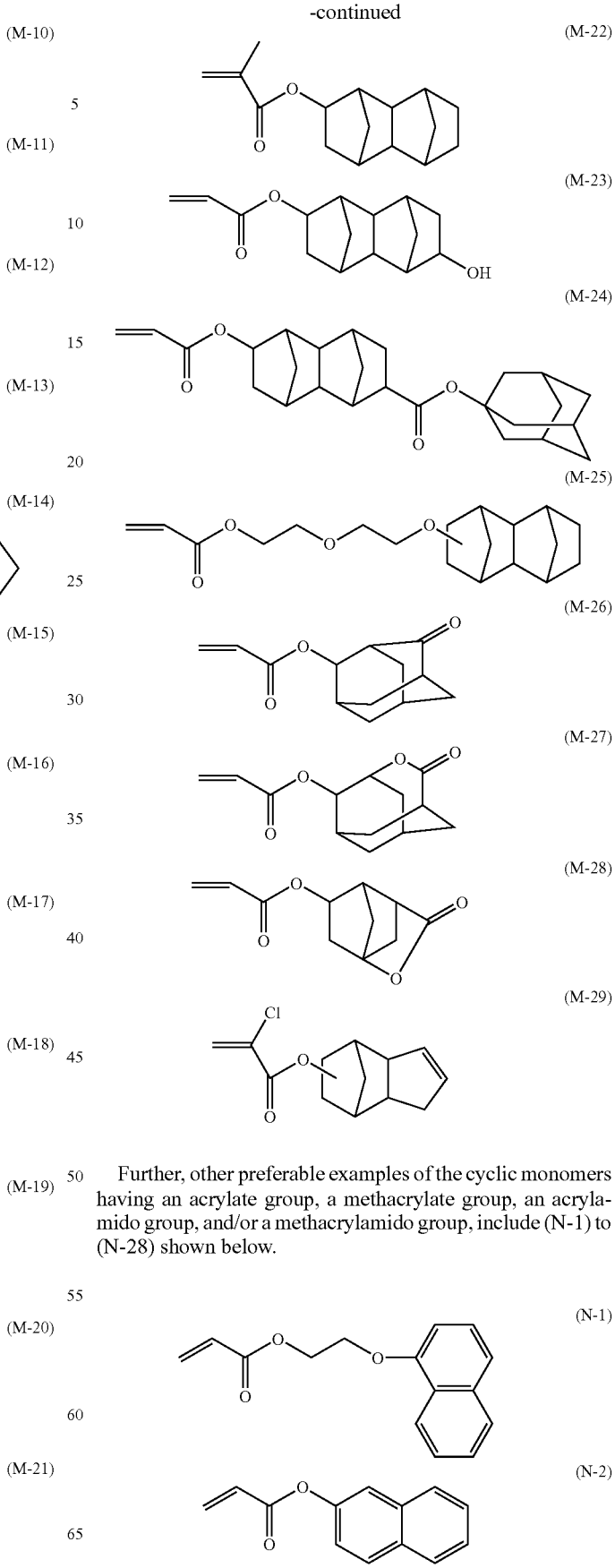
Further, other preferable examples of the cyclic monomers having an acrylate group, a methacrylate group, an acrylamido group, and/or a methacrylamido group, include (N-1) to (N-28) shown below.

-continued
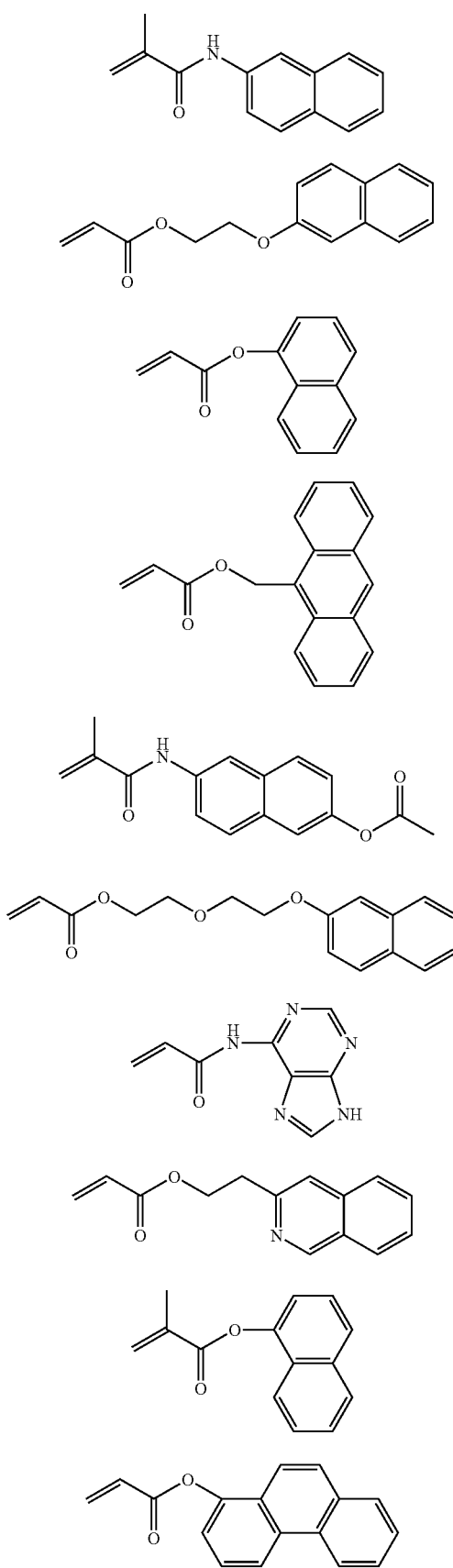
(N-3)
(N-4)
(N-5)
(N-6)
(N-7)
(N-8)
(N-9)
(N-10)
(N-11)
(N-12)
-continued
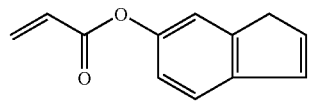
(N-13)
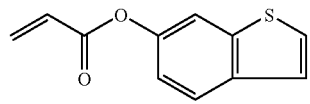
(N-14)
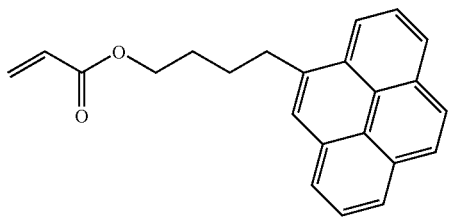
(N-15)
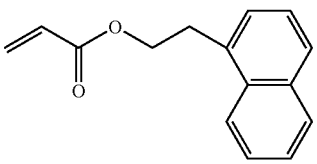
(N-16)
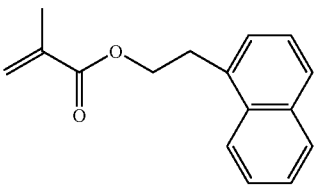
(N-17)
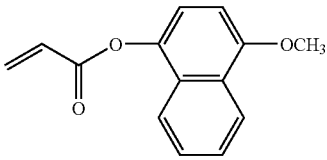
(N-18)
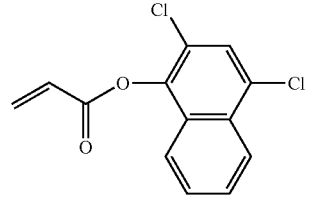
(N-19)
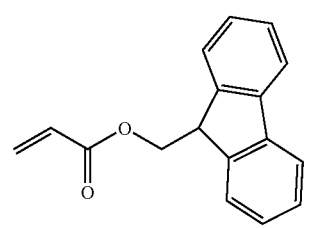
(N-20)

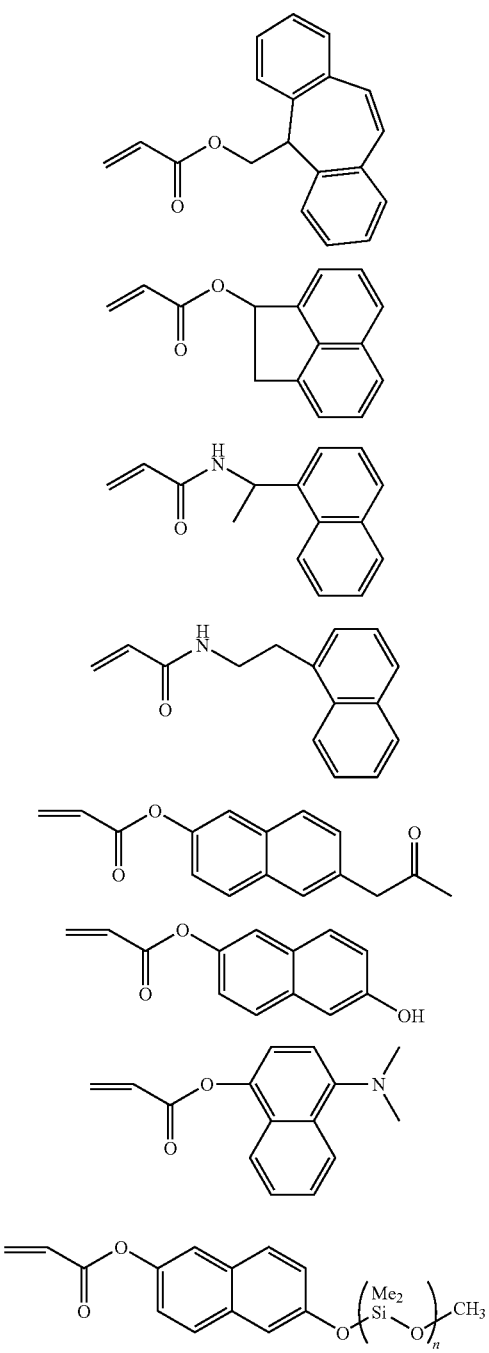

(N-21)
(N-22)
(N-23)
(N-24)
(N-25)
(N-26)
(N-27)
(N-28)

As the radically polymerizable monomer, an acyclic monofunctional monomer described below may be used in combination with the cyclic monomer, according to the necessity. The acyclic monofunctional monomer has a relatively low viscosity and may be used preferably for the purpose of lowering the viscosity of the composition. From the viewpoints of suppressing stickiness of the resultant cured film and giving a high film strength so as not to cause scratches and the like deficiency upon molding, the proportion of the acyclic monofunctional monomer below in the entire composition is preferably no greater than 20 mass %, more preferably no greater than 15 mass %, and particularly preferably no greater than 10 mass %.

Specific examples thereof include octyl (meth)acrylate, 2-ethylhexyl (meth)acrylate, decyl (meth)acrylate, dodecyl (meth)acrylate, tridecyl (meth)acrylate, tetradecyl (meth)acrylate, hexadecyl (meth)acrylate, 2-hydroxyethyl acrylate, butoxyethyl acrylate, carbitol acrylate, 2-ethylhexyl diglycolacrylate, polyethylene glycol (meth)acrylate monomethyl ether, polypropylene glycol (meth)acrylate monomethyl ether, and polytetraethylene glycol (meth)acrylate monomethyl ether.

As the radically polymerizable monomer, a polyfunctional monomer described below may be used in combination with the cyclic monomer, according to the necessity. By containing the polyfunctional monomer, a composition can be obtained, which is excellent in curability and gives a cured film with a high film strength. From the viewpoint of keeping stretchability of the resultant cured film suitable for molding, the proportion of the polyfunctional monomer in the entire composition is preferably no greater than 15 mass %, more preferably no greater than 10 mass %, and particularly preferably no greater than 5 mass %.

Specific examples thereof include bis(4-acryloxypolyethoxyphenyl)propane, neopentyl glycol di(meth)acrylate, 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol triacrylate, pentaerythritol tetraacrylate, dipentaerythritol tetraacrylate, trimethylolpropane triacrylate, tetramethylolmethane tetraacrylate, tetramethylolmethane triacrylate, dimethyloltricyclodecane diacrylate, modified glycerol triacrylates, modified bisphenol A diacrylates, diacrylates of bisphenol A PO adducts, diacrylates of bisphenol A EO adducts, dipentaerythritol hexaacrylate, and caprolactone-modified dipentaerythritol hexaacrylate.

The content of the polymerizable monomer(s) in the nonaqueous ink of the present invention is preferably 60 to 95 mass %, more preferably 65 to 90 mass %, and still more preferably 70 to 90 mass %. When the polymerizable monomer content is in the range above, the favorable ink curability by activating energy ray irradiation and the favorable transparent color tone characteristic each specific to the present invention are more evident.

Among the polymerizable monomers above, at least one of them is preferably a monofunctional monomer, and at least one of them is more preferably a monofunctional acrylate. Addition of the monofunctional monomer is preferable, to provide sufficient curability and sufficient flexibility of the resultant cured film. The proportion of the monofunctional radically polymerizable monomer in the composition is preferably 1 to 90 mass %, more preferably 50 to 90 mass %, and still more preferably 65 to 90 mass %. When a bifunctional or higher functional monomer (multifunctional monomer) is contained as the polymerizable monomer, the content of the bifunctional or higher functional monomer in the composition is preferably 0.5 to 50 mass %, more preferably 0.5 to 30 mass %, and still more preferably 0.5 to 20 mass %. The contents of the above various monomers in the ranges above are preferable, to give excellent curability and flexibility and also favorable viscosity.

Examples of the radical polymerization initiator that can be used in the nonaqueous ink of the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention is preferably used singly or in combination with the above ones.

Preferred examples of the aromatic ketone (a) and the thio compound (e) include a compound having a benzophenone skeleton (benzophenone compound) or a compound having a thioxanthone skeleton (thioxanthone compound), as described in "RADIATION CURING IN POLYMER SCIENCE AND TECHNOLOGY", by J. P. FOUASSIER and J. F. RABEK (1993), pp. 77 to 117. Preferred examples of the aromatic ketone (a), the acylphosphine compound (b), and the thio compound (e) include α-thiobenzophenone compounds described in JP-B-47-6416, benzoin ether compounds described in JP-B-47-3981, a-substituted benzoin compounds described in JP-B-47-22326, benzoin derivatives described in JP-B-47-23664, aroylphosphonic acid esters described in JP-A-57-30704, dialkoxybenzophenones described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzenes described in JP-A-2-211452, thio-substituted aromatic ketones described in JP-A-61-194062, acylphosphine sulfides described in JP-B-2-9597, acylphosphines described in JP-B-2-9596, thioxanthones described in JP-B-63-61950, and coumarins described in JP-B-59-42864.

Examples of the benzophenone compound include benzophenone, 4-phenylbenzophenone, isophthalophenone, and 4-benzoyl-4'-methylphenylsulfide. Examples of the thioxanthone compound include 2,4-diethylthioxanthone, 2-isopropylthioxanthone, and 2-chlorothioxanthone.

In the present invention, the aromatic ketone (a) is preferably an α-hydroxyketone, and examples thereof include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone. Among them, as the aromatic ketone (a) a 1-hydroxycyclohexyl phenyl ketone compound is particularly preferable. The 1-hydroxycyclohexyl phenyl ketone compound referred to in the present invention means 1-hydroxycyclohexyl phenyl ketone and a compound obtained by further substituting 1-hydroxycyclohexyl phenyl ketone with any substituent. The substituent may be selected optionally from those that enable the compound to exhibit an ability as a radical polymerization initiator, and specific examples thereof include an alkyl group (e.g. a methyl group, an ethyl group, a propyl group, a butyl group, etc.).

Acylphosphine compound (b) is preferably an acylphosphine oxide compound.

Examples of the acylphosphine oxide compound include a compound that has a structure represented by the formula (7) or (8). The acylphosphine oxide compound is particularly preferably one having a chemical structure represented by the formula (9) or (10).

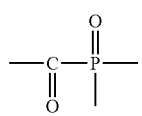

Formula (7)

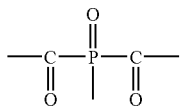

Formula (8)

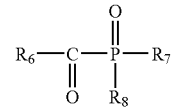

Formula (9)

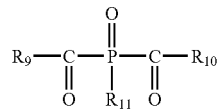

Formula (10)

In the formula, $R_6$, $R_7$, and $R_8$ denote an aromatic hydrocarbon group, which may have a methyl group or an ethyl group as a substituent. In the formula, $R_9$, $R_{10}$, and $R_{11}$ denote an aromatic hydrocarbon group, which may have a methyl group or an ethyl group as a substituent.

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-63-40799. Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-toluoylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyidiphenylphosphine oxide, o-toluoyldiphenylphosphine oxide, p-t-butylbenzoyldiphenylphosphine oxide, 3-pyridylcarbonyldiphenylphosphine oxide, acryloyidiphenylphosphine oxide, benzoyidiphenylphosphine oxide, vinyl pivaloylphenylphosphinate, adipoyl-bis-diphenylphosphine oxide, pivaloyidiphenylphosphine oxide, p-toluoyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Concrete examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5- dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis (2-methyl-1-naphthoyl)-4-propylphenylphosphine oxide, bis (2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, preferred examples of the acylphosphine oxide compound in the present invention include bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, and 2,4,6-trimethylbenzoyldiphenylphosphine oxide (Darocur TPO: manufactured by Ciba Specialty Chemicals, Lucirin TPO: manufactured by BASF).

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in European Patent No. 104143, U.S. Pat. No. 4,837,124, JP-A-2-150848, and JP-A-2-96514, diazonium salts (optionally further substituted benzenediazoniums, etc.) described in European Patent Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxy-pyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

As the ketoxime ester compound (g), there can be cited 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-p-toluenesulfonyloxyiminobutane-2-one, and 2-ethoxycarbonyloxy-imino-1-phenylpropane-1-one.

Examples of the borate compound (h) include compounds described in U.S. Pat. Nos. 3,567,453 and 4,343,891, and EP Nos. 109,772 and 109,773.

Examples of the azinium compound (I) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the titanocene compound include dichlorobis(cyclopentadienyl)titanium, bis(cyclopentadienyl)bis(phenyl)titanium, bis(cyclopentadienyl)bis(2,3,4,5,6-pentafluorophenyl)titanium, bis(cyclopentadienyl)bis(2,3,5,6-tetrafluorophenyl)titanium, bis(cyclopentadienyl)bis(2,4,6-trifluorophenyl)titanium, bis(cyclopentadienyl)bis(2,6-difluorophenyl)titanium, bis(cyclopentadienyl)bis(2,4-difluorophenyl)titanium, bis(methylcyclopentadienyl)bis(2,3,4,5,6-pentafluorophenyl)titanium, bis(methylcyclopentadienyl)bis(2,3,5,6-tetrafluorophenyl)titanium, bis(methylcyclopentadienyl)bis(2,4-difluorophenyl)titanium, bis(cyclopentadienyl)bis[2,6-difluoro-3-(pyrroyl-1-yl)phenyl]titanium, bis(cyclopentadienyl)bis[2,6-difluoro-3-(methylsulfonamido)phenyl]titanium, and bis(cyclopentadienyl)bis[2,6-difluoro-3-(N-butylbiaroylamino)phenyl]titanium Examples of the active ester compound (k) include nitrobenzyl ester compounds described in European Patent Nos. 0290750, 046083, 156153, 271851, and 0388343, U.S. Pat. Nos. 3,901,710 and 4,181,531, JP-A-60-198538, and JP-A-53-133022, iminosulfonate compounds described in European Patent Nos. 0199672, 84515, 199672, 044115, and 0101122, U.S. Pat. Nos. 4,618,564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (I) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

The total amount of the polymerization initiators in the ink composition or in the surface-coating composition for use in the present invention is preferably in the range of 0.01 to 35 mass %, more preferably 0.5 to 20 mass %, and still more preferably 1.0 to 15 mass % to the total amount of the polymerizable monomers. The ink composition can be cured with 0.01 mass % or greater of the polymerization initiator sufficiently, and a cured film having a uniform degree of curing can be obtained with 35 mass % or less. When a sensitizer described below is used in the ink composition or the surface-coating composition for use in the present invention, the total amount of the polymerization initiators used with respect to the sensitizer, i.e., the ratio of polymerization initiators: sensitizer, is preferably in the range of 200:1 to 1:200, more preferably 50:1 to 1:50, and still more preferably 20:1 to 1:5 by mass.

The ink according to the present invention may contain other additives. Examples of the other additives include known additives such as resin fine particles, polymer latexes, ultraviolet absorbents, discoloration preventing agents, fungicides, pH adjusting agent, antirusts, antioxidants, emulsion stabilizers, antiseptics, antifoams, viscosity improvers, dispersion stabilizers and chelating agents.

Examples of the resin fine particles for use include fine particles such as of acrylic resins, vinyl acetate resins, styrene-butadiene resins, vinyl chloride resins, acryl-styrenic resins, butadiene resins, styrenic resins, crosslinked acrylic resins, crosslinked styrenic resins, benzoguanamine resins, phenol resins, silicone resins, epoxy resins, urethane resins, paraffin resins and fluorine resins, and the polymer latexes containing them.

Favorable examples thereof include fine particles such as of acrylic resins, acryl-styrene resins, styrene resins, crosslinked acrylic resins, and crosslinked styrene resins and the latex polymers containing them.

When an inkjet ink is produced by adding resin fine particles or a polymer latex, the resin fine particles or the polymer latex is preferably added simultaneously with the pigment and the like during preparation of the pigment dispersion, for improving their fixing efficiency.

The weight-average molecular weight of the resin fine particles is preferably 10,000 or more and 200,000 or less, more preferably 100,000 or more and 200,000 or less. The average diameter of the resin fine particles is preferably in the range of 10 nm to 1 μm, more preferably 10 to 200 nm, and still more preferably 20 to 100 nm, and particularly preferably 20 to 50 nm. The amount of resin fine particles added is preferably 0.5 to 20 mass %, more preferably 3 to 20 mass %, and still more preferably 5 to 15 mass % to the inkjet ink. The glass transition temperature (Tg) of the resin fine particles is preferably 30° C. or higher, more preferably 40° C. or higher, and still more preferably 50° C. or higher.

In addition, the particle diameter distribution of the polymer particles of the latex polymer is not particularly limited, and both polymer particles having a wide particle diameter distribution and those having a particle diameter distribution in the monodispersion state can be used. Alternatively, polymer fine particles having a particle diameter distribution in the monodispersion state may be used in combination of two or more.

Examples of the ultraviolet absorbents include benzophenone-based ultraviolet absorbents, benzotriazole-based ultraviolet absorbents, salicylate-based ultraviolet absorbents, cyanoacrylate-based ultraviolet absorbents, nickel complex salt-based ultraviolet absorbents, and the like.

Discoloration Preventing Agent (Anti-Fading Agent)

In the ink composition of the present invention, any one of various organic- or metal complex-series discoloration inhibitors may be used. Examples of the organic anti-fading agent include hydroquinones, alkoxyphenols, dialkoxyphenols, phenols, anilines, amines, indans, chromans, alkoxyanilines, and heterocyclic compounds. Examples of the metal complex-series anti-fading agents include nickel complexes, and zinc complexes.

Examples of the fungicides include sodium dehydroacetate, sodium benzoate, sodium pyridinethion-1-oxide, ethyl p-hydroxybenzoate ester, 1,2-benzisothiazolin-3-one, sodium sorbate, pentachlorophenol sodium salt and the like. These fungicides are preferably used in an amount of 0.02 to 1.00 mass % in ink.

The pH adjusting agent is not particularly limited and can be selected according to application, if it can adjust the pH without any adverse influence on the inkjet recording liquid prepared, and examples thereof include alcohol amines (such as diethanolamine, triethanolamine and 2-amino-2-ethyl-1,3 propanediol), alkali metal hydroxides (such as lithium hydroxide, sodium hydroxide and potassium hydroxide), ammonium hydroxides (such as ammonium hydroxide and quaternary ammonium hydroxides), phosphonium hydroxides, alkali metal carbonate salts and the like.

Examples of the antirusts include acidic sulfite salts, sodium thiosulfate, ammonium thiodiglycolate, diisopropylammonium nitrite, pentaerythritol tetranitrate, dicyclohexylammonium nitrite and the like.

Examples of the antioxidants include phenol-based antioxidants (including hindered phenol-based antioxidants), amine-based antioxidants, sulfur-based antioxidants, phosphorous-based antioxidants and the like.

Examples of the chelating agent include sodium ethylenediaminetetraacetate, sodium nitrilotriacetate, hydroxyethylethylenediaminetriacetic acid sodium salt, diethylenetriaminepentaacetic acid sodium salt, sodium uramildiacetate and the like.

A sensitizer may be added to the ink according to the present invention for acceleration of decomposition of the polymerization initiator by absorption of a particular activating energy ray. The sensitizer is excited into the electronically excited state by absorption of the particular activating energy ray. The sensitizer excited into the electronically excited state exhibits an action such as electron transfer, energy transfer or heat generation, in contact with a polymerization initiator. In this way, the polymerization initiator shows a chemical change, resulting in decomposition and generation of a radical, acid or base. The sensitizer favorably used in the present invention is a sensitization colorant. Examples of the favorable sensitization colorants include compounds belonging to the following compound group and having absorption in a wavelength range of 350 nm to 450 nm. Typical examples thereof include polynuclear aromatic compounds (such as pyrene, perylene and triphenylene), xanthenes (such as fluorescein, eosin, erythrocin, rhodamine B and rose bengal), cyanines (such as thiacarbocyanine and oxacarbocyanine), merocyanines (such as merocyanine and carbomerocyanine), thiazines (such as thionine, methylene blue and toluidine blue), acridines (such as acridine orange, chloroflavine and acriflavine), anthraquinones (such as anthraquinone), squaliums (such as squalium), and coumarins (such as 7-diethylamino-4-methyl coumarin).

Examples of more favorable sensitization colorants include the compounds represented by the following formulae (IX) to (XIII).

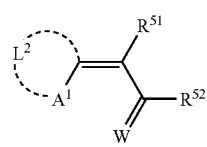
(IX)

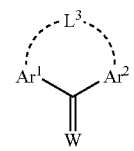
(X)

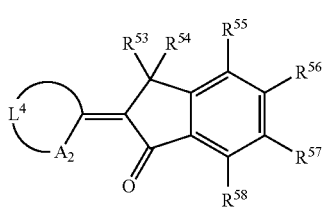
(XI)

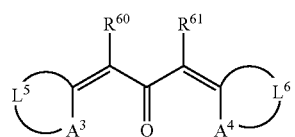
(XII)

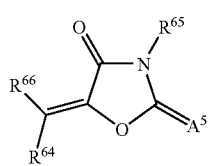
(XIII)

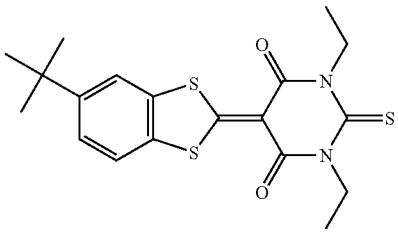
(E-1)

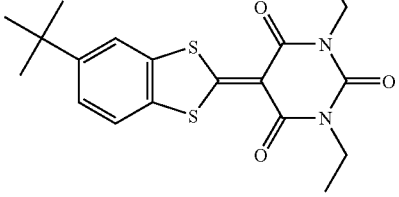
(E-2)

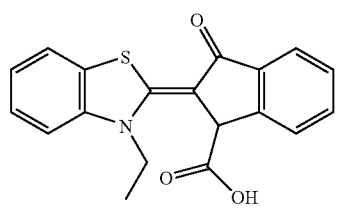
(E-3)

(E-4)

(E-5)

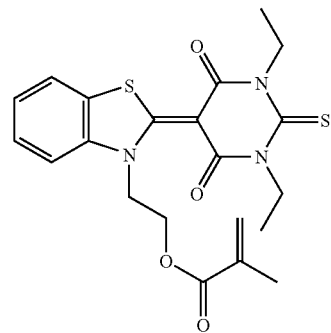

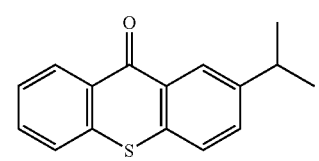
(E-6)

(E-7)

In the formula (IX), $A^1$ represents a sulfur atom or $NR^{50}$; $R^{50}$ represents an alkyl group or an aryl group; $L^2$ represents a non-metal atom group to form a basic nucleus of the colorant in combination with the adjacent $A^1$ and the adjacent carbon atom; $R^{51}$ and $R^{52}$ each independently represent a hydrogen atom or a monovalent non-metal atom group; and $R^{51}$ and $R^{52}$ may bond to each other, forming an acid ring of the colorant. W represents an oxygen atom or a sulfur atom. In the formula (X), $Ar^1$ and $Ar^2$ each independently represent an aryl group and are bound via a bond of $-L^3-$, wherein, L3 represents —O— or —S—, and W is the same as that shown in the formula (IX). In the formula (XI), $A^2$ represents a sulfur atom or $NR^{59}$; $L^4$ represents a non-metal atom group to form the basic nucleus of the colorant with the adjacent $A^2$ and the adjacent carbon atom in combination. $R^{53}$, $R^{54}$, $R^{55}$, $R^{56}$, $R^{57}$ and $R^{58}$ each independently represent a monovalent non-metal atom group; and $R^{59}$ represents an alkyl group or an aryl group. In the formula (XII), $A^3$ and $A^4$ each independently represent —S—, —$NR^{62}$— or —$NR^{63}$—; $R^{62}$ and $R^{63}$ each independently represent a substituted or unsubstituted alkyl group or a substituted or unsubstituted aryl group; $L^5$ and $L^6$ each independently represents, a non-metal atom group to form the basic nucleus of the colorant together with the adjacent $A^3$ and $A^4$ and the adjacent carbon atom; and $R^{60}$ and $R^{61}$ each independently represents a hydrogen atom or a monovalent non-metal atom group that can form an aliphatic or aromatic ring bonding to each other. In the formula (XIII), $R^{66}$ represents a hetero-ring or an aromatic ring that may be further substituted, and $A^5$ represents an oxygen atom, a sulfur atom or =$NR^{67}$. $R^{64}$, $R^{65}$ and $R^{67}$ each independently represents a hydrogen atom or a monovalent non-metal atom group; and $R^{67}$ and $R^{64}$, and also $R^{65}$ and $R^{67}$ can bind to each other, forming an aliphatic or aromatic ring. Preferable typical examples of the compounds represented by the formulae (IX) to (XIII) include the compounds (E-1) to (E-20) shown below.

-continued (E-8) 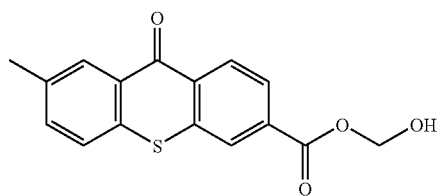

(E-9) 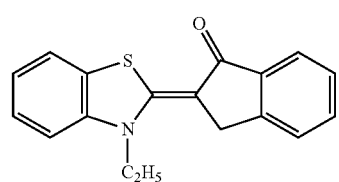

(E-10) 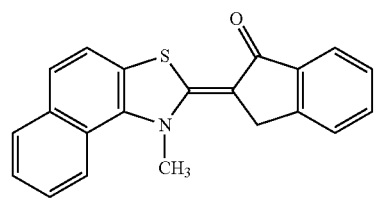

(E-11) 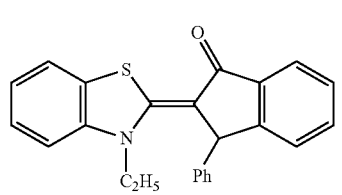

(E-12) 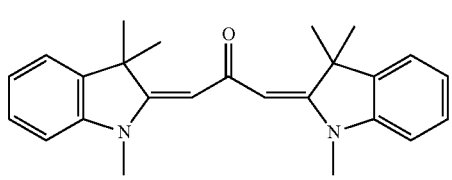

(E-13) 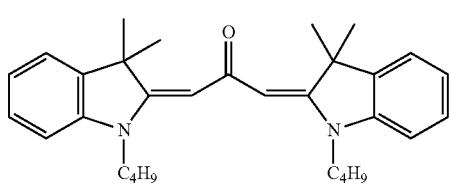

(E-14) 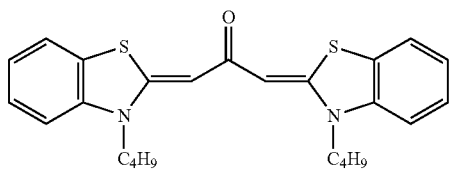

(E-15) 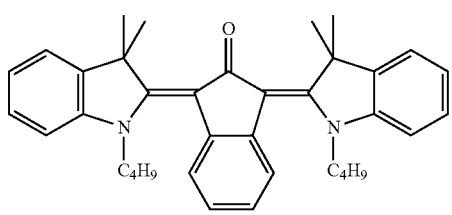

-continued (E-16) 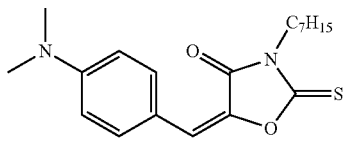

(E-17) 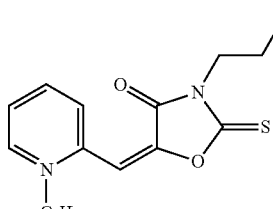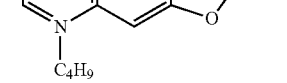

(E-18) 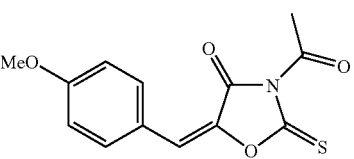

(E-19) 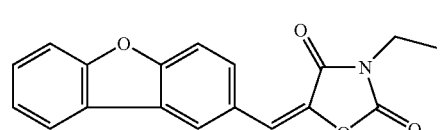

(E-20) 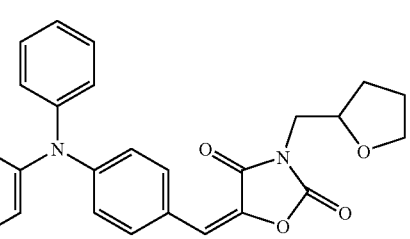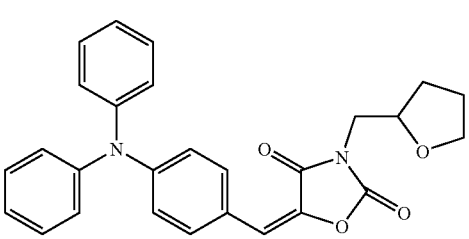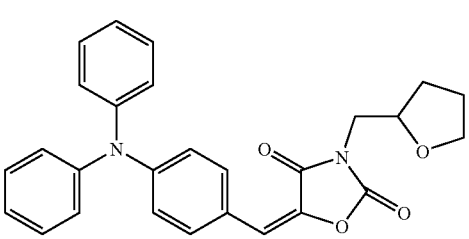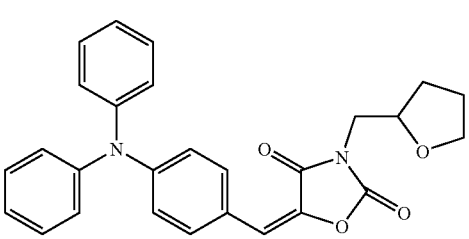

The content of the sensitizing agent in the ink composition of the present invention is properly selected according to the intended purpose, but it is preferably 0.05 to 4 mass % relative to the weight of the entire ink composition.

The ink composition of the present invention preferably comprises a cosensitizing agent. In the present invention, the cosensitizing agent has the function of further improving the sensitivity of the sensitizing dye to actinic radiation or the function of suppressing inhibition by oxygen for polymerization of a polymerizable compound, etc. Examples of such a cosensitizing agent include amines such as compounds described in M.R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizing agent include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and .beta.-mercaptonaphthalene.

Still other examples of the cosensitizing agent include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), Si—H compounds and Ge—H compounds described in JP-A-6-191605.

The content of the cosensitizing agent in the ink composition of the present invention is properly selected according to the intended purpose, but it is preferably 0.05 to 4 mass % relative to the mass of the entire ink composition.

The surface tension of the ink according to the present invention (at 20° C.) is preferably 20 mN/m or more and 60 mN/m or less. It is more preferably, 20 mN/m or more and 45 mN/m or less, still more preferably 25 mN/m or more and 40 mN/m or less. The surface tension is a value measured by using a surface tension balance (such as Surface Tension Balance CBVP-Z, manufactured by Kyowa Interface Science Co., Ltd.) according to the Wilhelmy method under the condition of a liquid temperature of 20° C. and 60% RH. The surface tension can be adjusted into a desired range, for example, by addition of a surfactant.

The viscosity of the inkjet recording liquid according to the present invention at 20° C. is preferably 5 mPa·s or more and 20 mPa·s or less, more preferably 5.5 mPa·s or more and less than 18 mPa·s, and still more preferably 6 mPa·s or more and less than 16 mPa·s from the viewpoint of ejecting efficiency. Alternatively, the viscosity of the inkjet recording liquid according to the present invention at 40° C. is preferably 3 mPa·s or more and 15 mPa·s or less, more preferably 3.5 mPa·s or more and less than 12 mPa·s and still more preferably 4 mPa·s or more and less than 10 mPa·s, and the viscosity can be adjusted into a desired range, for example, by modification of the molecular weight and the content of the water-soluble organic solvent. In the present invention, the viscosity can be adjusted into desired range more easily when the liquid contains the first water-soluble organic solvent described above. The viscosity is a value determined at 20° C. or 40° C. by using a TV-22 viscometer (manufactured by Toki Sangyo Co., Ltd.).

Recorded articles can be prepared by printing in a conventional manner by using the nonaqueous ink according to the present invention. For example, it is an inkjet printing process of printing an image by forming and ejecting microdroplets of ink reproducibly onto a desired area and fixing the droplets there. An inkjet recording apparatus described below can be used preferably in forming an image or a surface-coating layer by the inkjet printing process.

In accordance with the inkjet recording method of the present invention, the ink is energized, to foam an image on an image-receiving material (e.g., ordinary papers, resin-coated papers, films, electrophotographic papers, clothes, glasses, metals, ceramics, inkjet papers, as described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947). The method described in JP-A-2003-306623, paragraph numbers 0093 to 0105 can be applied as the inkjet recording process preferable in the present invention.

In foaming an image, a polymer latex compound may be used in combination for the purpose of giving glossiness or water resistance or improving the weather resistance. The timing of imparting the polymer latex to the image-receiving material may be before or after imparting the coloring agent or simultaneously with it. Accordingly, the site to which the latex polymer compound is added may be in the image-receiving paper or ink, or a liquid material composed of the latex polymer compound singly may be prepared and used.

More specifically, the methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944), and JP-A-2002-80759 (Japanese Patent Application No. 2000-268952) can be preferably used.

An inkjet recording device used in the inkjet recording method of the present invention is not particularly limited, and any known inkjet recording device that can achieve an intended resolution may be used. The inkjet recording device that can be used in the present invention is equipped with, for example, an ink supply system, a temperature sensor, and an actinic radiation source. The ink supply comprises, for example, a main tank containing the ink composition of the present invention, a supply pipe, an ink supply tank immediately before an inkjet head, a filter, and a piezo system inkjet head. The piezo system inkjet head may be driven so as to eject a multisize dot of preferably 1 to 100 pL, and more preferably 8 to 30 pL, at a resolution of preferably 320.times.320 to 4,000.times.4,000 dpi, more preferably 400.times.400 to 1,600.times.1,600 dpi, and yet more preferably 720.times.720 dpi. Here, dpi referred to in the present invention means the number of dots per 2.54 cm.

As described above, since it is desirable for the radiation curing type ink to be ejected at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is ejected using the above mentioned inkjet recording device, the ink composition is preferably ejected after being heated to preferably 25° C. to 80° C., and more preferably 25° C. to 50° C., so as to reduce the viscosity of the ink composition to preferably 3 to 15 mPas, and more preferably 3 to 13 mPas. In particular, it is preferable to use the ink composition having an ink viscosity at 25° C. of no more than 50 mPas since a good ejecting stability can be obtained. By employing this method, high ejecting stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of ejecting is large. Viscosity variation in the ink has a large effect on changes in liquid droplet size and changes in liquid droplet discharge speed and, consequently, causes the image quality to be degraded. It is therefore necessary to maintain the ink ejecting temperature as constant as possible. In the present invention, the control range for the temperature is desirably preferably ±5° C. for a set temperature, more preferably ±2° C. for the set temperature, and yet more preferably ±1° C. for the set temperature.

The ink composition ejected onto the recording medium cures upon exposure to actinic radiation. This is due to an initiating species such as a radical, an acid, or a base being generated by decomposition of the polymerization initiator contained in the ink composition of the present invention by irradiation with actinic radiation, the initiating species functioning so as to make a polymerization reaction of a radically polymerizable compound take place and to promote it. In this process, if a sensitizing colorant is present together with the polymerization initiator in the ink composition, the sensitizing colorant in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α-rays, γ-rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm. Furthermore, in the present invention, the polymerization initiation system has sufficient sensitivity for low output actinic radiation. The actinic radiation is applied therefore so that the illumination intensity on the exposed surface is, for example, 10 to 4,000 mW/cm.sup.2, and preferably 20 to 2,500 mW/cm.sup.2.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected. Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable. The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is preferably exposed to such actinic radiation for preferably 0.01 to 120 sec., and more preferably 0.1 to 90 sec. Irradiation conditions and a basic method for irradiation with actinic radiation are disclosed in JP-A-60-132767. Specifically, a light source is provided on either side of a head unit that includes an ink ejecting device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted. Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink even for various types of recording media having different surface wettability, thereby improving the image quality. In order to obtain a color image, it is preferable to superimpose colors in order from those with a low brightness. By superimposing inks in order from one with low brightness, it is easy for radiation to reach a lower layer ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing. In this way, the ink composition of the present invention is cured by irradiation with actinic radiation in high sensitivity to thus form an image on the surface of the recording medium.

The present invention, which addresses solving problems of nonaqueous hardening inks, can provide a nonaqueous ink superior in hardening efficiency and ejecting stability, and capable of providing a superior transparency and abrasion resistance for the formed image. Furthermore, the present invention can provide an image-recording method, an image-recording apparatus and a recorded article by using the nonaqueous ink.

The present invention will be described in more detail based on the following examples, but the invention is not intended to be limited thereto. In the following examples, the terms "part(s)" and "%" are values by mass, unless otherwise specified.

EXAMPLES (Preparation of Magenta Pigment A)

As a dispersant, 10 mass parts of polyvinylpyrolidone K25 (trade name, manufactured by Tokyo Kasei Kogyo Co., Ltd.) was dissolved in 80 mass parts of dimethylsulfoxide, and thereto 10 mass parts of a quinacridone pigment of C.I. PR122 was suspended in a flask at 25° C. under an atmosphere of the air. Then, thereto, 25% tetramethylammonium hydroxide methanol solution (manufactured by Wako Pure Chemical Industries, Ltd.) was added dropwise in small portions, for solubilization of the quinacridone pigment, to give a dark blue purple solution.

The pigment solution was stirred for 3 hours, and was poured rapidly to ion-exchange water (400 parts of the ion-exchange water with respect to 10 parts of the pigment: 5° C.) which was agitated with impeller-type stirring blades (800 rpm) and was kept to cool, by using two System Dispensers (manufactured by Musashi Engineering, Inc., needle internal diameter: 0.58 mm, discharging pressure: 4.0 kgf/cm$^2$), to give a transparent reddish aqueous pigment dispersion containing pigment-containing particles (colorant particles).

The average volume particle diameter of the aqueous pigment dispersion, as determined by the dynamic light scattering method, was 24.2 nm (TEM average particle diameter: 19.8 nm), and the ratio of volume-average particle diameter Mv/number-average particle diameter Mn, an indicator of monodispersibility, was 1.19.

Then, hydrochloric acid was added dropwise to the aqueous pigment dispersion to adjust pH to 7.0, the resultant dispersion was filtered through a membrane filter of average pore size 0.1 μm under a reduced pressure, and the residue was washed five times with ion-exchange water to remove the salt and solvent, to give a paste of the pigment-containing particle dispersion.

Then, 100 parts of ethyl lactate was added to the paste, followed by agitation and ultrasonication. The resultant mixture was then filtered through a membrane filter of average pore size 0.1 μm under a reduced pressure, and the residue paste was washed with ion-exchange water and filtered once again through a membrane filter of average pore size 0.1 μm under a reduced pressure, to give a paste of the pigment-containing particle dispersion. Then, the thus-obtained paste of the dispersion containing the pigment-containing particles was spray dried, to give a Magenta Pigment A.

(Preparation of Magenta Pigment B)

A Magenta Pigment B was obtained in the same manner as the Magenta Pigment A, except that C.I. PR122 was replaced with C.I. PV19.

(Preparation of Magenta Pigment C)

A Magenta Pigment C was obtained in the same manner as the Magenta Pigment A, except that C.I. PR122 was replaced with 5 mass parts of C.I. PR122 and 5 mass parts of C.I. PV19.

(Preparation of Magenta Pigment D)

A Magenta Pigment D was obtained in the same manner as the Magenta Pigment A, except that C.I. PR122 and ethyl lactate were replaced with C.I. PR202 and methanol, respectively.

(Preparation of Magenta Pigment E)

A Magenta Pigment E was obtained in the same manner as the Magenta Pigment A, except that the agitation and ultrasonication by using ethyl lactate were not conducted.

(Preparation of Magenta Pigment F)

A Magenta Pigment F was obtained in the same manner as the Magenta Pigment A, except that the agitation and ultrasonication by using ethyl lactate were changed to agitation treatment at 50° C. for 1 hour by using a 25% aqueous methanol solution.

(Preparation of Magenta Pigment H)

A Magenta Pigment H was obtained in the same manner as the Magenta Pigment A, except that the spray drying was replaced with drying under heating at 100° C.

(Preparation of Magenta Pigment I)

A Magenta Pigment I was obtained in the same manner as the Magenta Pigment A, except that 10 mass parts of polyvinylpyrrolidone was not used.

(Preparation of Cyan Pigment A)

As a dispersant, 10 mass parts of polyvinylpyrrolidone K25 (trade name, manufactured by Tokyo Kasei Kogyo Co., Ltd.), and 10 mass parts of C.I. PB15:3 phthalocyanine pigment were dissolved in 80 mass parts of a mixed liquid of methanesulfonic acid and formic acid in a flask at 25° C., under an atmosphere of the air, to give a pigment solution.

The pigment solution was stirred for 3 hours, and added rapidly to ion-exchange water (400 parts of ion-exchange water with respect to 10 parts of pigment, at 5° C.), which was stirred with impeller-type stirring blades (800 rpm) and was kept to cool, by using two System Dispensers (manufactured by Musashi Engineering, Inc., needle internal diameter: 0.58 mm, discharging pressure: 4.0 kgf/cm$^2$), to give a transparent bluish aqueous pigment dispersion containing pigment-containing particles (colorant particles).

Then, sodium hydroxide was added dropwise to the aqueous pigment dispersion to adjust the pH to 7.0, the resultant mixture was filtered through a membrane filter of average pore size 0.1 μm under a reduced pressure, and the residue was washed five times with ion-exchange water to remove the salt and solvent, to give a paste of the dispersion of pigment-containing particles.

Then, 100 parts of methanol was added to the paste, followed by stirring and ultrasonication. The resultant mixture was then filtered through a membrane filter of average pore size 0.1 μm under a reduced pressure, and the residue paste was washed with ion-exchange water and filtered once again through a membrane filter of average pore size 0.1 μm under a reduced pressure, to give a paste of the dispersion containing pigment-containing particles. The paste of the dispersion containing pigment-containing particles thus obtained was then spray-dried, to give a Cyan Pigment A.

(Preparation of Cyan Pigment B)

A Cyan Pigment B was obtained in the same manner as the Cyan Pigment A, except that 10 mass parts of polyvinylpyrrolidone was replaced with 2 mass parts of polyvinylpyrrolidone.

(Preparation of Yellow Pigment A)

A Yellow Pigment A was obtained in the same manner as the Magenta Pigment A, except that C.I. PR122 was replaced with C.I. PY128.

(Preparation of Yellow Pigment B)

A Yellow Pigment B was obtained in the same manner as the Yellow Pigment A, except that C.I. PR122 was replaced with C.I. PY74.

(Preparation of Yellow Pigment C)

A Yellow Pigment C was obtained in the same manner as the Yellow Pigment A, except that 10 parts by mass of polyvinylpyrolidone was replaced with 2 parts by mass of polyvinylpyrolidone.

(Preparation of Magenta MillBases a to F, H, and I)

300 mass parts of any of the thus-obtained Magenta Pigments A to F, H, and I, 600 mass parts of Actilane 421 (trade name, manufactured by Akcros), and 150 mass parts of Solsperse 32000 (trade name, manufactured by Noveon) were agitated and blended in a dispersing machine Motormill M50 (manufactured by Eiger) by using 0.05-mm zirconia beads at a peripheral speed of 9 m/s, to give Magenta Millbases A to F, H, and I, respectively. The Magenta Millbases A to F were obtained by dispersing for 6 hours, while the Magenta Millbases H and I for 10 hours.

(Preparation of Magenta Millbase G)

A Magenta Millbase G was obtained in the same manner as the Magenta Millbase A, except that the magenta pigment was replaced with C.I. PR122 used in the production of the Magenta Pigment A and that the time period for dispersion was changed to 16 hours.

(Preparation of Cyan Millbases A and B)

Cyan Millbases A and B were obtained in the same manner as the Magenta Millbase A, except that the magenta pigment was replaced with the Cyan Pigments A and B, respectively, and that the time period for dispersion was changed to 4 hours.

(Preparation of Cyan Millbase C)

A Cyan Millbase C was obtained in the same manner as the Magenta Millbase A, except that the magenta pigment was replaced with PB 15:3 used in the production of the Cyan Pigment A, and that the time period for dispersion was changed to 12 hours.

(Preparation of Yellow Millbases A to C)

Yellow Millbases A to C were obtained in the same manner as the Magenta Millbase A, except that the magenta pigment was replaced with the Yellow Pigments A to C, respectively.

(Preparation of Yellow Millbase D)

A Yellow Millbase D was obtained in the same manner as the Magenta Millbase A, except that the magenta pigment was replaced with C.I. PY74 used in the production of the Yellow Pigment B, and that the time period for dispersion was changed to 10 hours.

The materials used in the above examples are as shown below (all trade names). (Monofunctional radical polymerizing monomer (hereinafter also referred to as "cyclic monofunctional monomer"))

FANCRYL FA-512A (manufactured by Hitachi Chemical Co., Ltd.)
FANCRYL FA-513M (manufactured by Hitachi Chemical Co., Ltd.)
2-naphthyl acrylate
SR506 (isoboronyl acrylate, manufactured by Sartomer)
NK ester AMP-10G (phenoxyethyl acrylate, manufactured by Shin-Nakamura Chemical Co., Ltd.)
Tetrahydrofurfuryl acrylate (manufactured by Aldrich)
N-cyclohexyl(meth)acrylamide (manufactured by DSM)
N-vinylcaprolactam (NVC, manufactured by ISP)

(Other Radical Polymerizing Monomer)

SR489D (an acyclic monofunctional monomer: tridecyl acrylate, manufactured by Sartomer)
Actilane 421 (a difunctional monomer: propoxylated neopentyl glycol diacrylate, manufactured by Akcros)
Rapi-Cure DVE-3 (triethylene glycol divinyl ether, manufactured by ISP)

(Polymer Dispersing Agent)

Solsperse 32000 (a dispersing agent, manufactured by Noveon)
Solsperse 36000 (a dispersing agent, manufactured by Noveon)

(Radical Polymerizing Initiator)

Lucirin TPO (2,4,6-trimethylbenzoyldiphenylphosphine oxide, manufactured by BASF)
Benzophenone (manufactured by Wako Pure Chemical Industries, Ltd.)
IRGACURE 184 (1-hydroxycyclohexyl phenyl ketone, manufactured by Ciba Specialty Chemicals)
FIRSTCURE ITX (manufactured by Chem First)

(Other Additive)

BYK-307 (a surfactant, manufactured by BYK Chemie)
FIRSTCURE ST-1 (a polymerization inhibitor, manufactured by Chem First)

Example 1

The Magenta Millbase A obtained above and the components for the following ink composition were mixed in a high-speed ice-cooled stirrer. The resultant mixture was filtered through a 5-μm membrane filter, to give a Magenta Ink A.

(Composition of Ink)

| Composition | Addition amount (mass part) |
| --- | --- |
| Magenta Millbase A | 10.0 |
| N-vinylcaprolactam | 25.0 |
| FANCRYL FA-512A | 31.4 |
| NK Ester AMP-10G | 20.0 |
| FIRSTCURE ST-1 | 0.05 |
| Lucirin TPO | 8.5 |
| Benzophenone | 3.0 |
| IRGACURE 184 | 2.0 |
| BYK-307 | 0.05 |

Examples 2 to 6

Magenta Inks B to F were obtained in the same manner as in Example 1, except that the Magenta Millbase A was replaced with any of the Magenta Millbases B to F, respectively.

Comparative Examples 1 to 3

Magenta Inks G to I were obtained in the same manner as in Example 1, except that the Magenta Millbase A was replaced with any of the Magenta Millbases G to I, respectively.

Example 7

The Cyan Millbase A obtained above and the components for the following ink composition were mixed in a high-speed ice-cooled stirrer. The resultant mixture was filtered through a 5-μm membrane filter, to give a Cyan Ink A.

(Composition of Ink)

| Composition | Addition amount (mass part) |
| --- | --- |
| Cyan Millbase A | 6.0 |
| N-vinylcaprolactam | 25.0 |
| FANCRYL FA-512A | 35.4 |
| NK Ester AMP-10G | 20.0 |
| FIRSTCURE ST-1 | 0.05 |
| Lucirin TPO | 8.5 |
| Benzophenone | 3.0 |
| IRGACURE 184 | 2.0 |
| BYK-307 | 0.05 |

Example 8

A Cyan Ink B was obtained in the same manner as in Example 7, except that the Cyan Millbase A was replaced with the Cyan Millbase B.

Comparative Example 4

A Cyan Ink C was obtained in the same manner as in Example 7, except that the Cyan Millbase A was replaced with the Cyan Millbase C.

Example 9

The Yellow Millbase A obtained above and the components for the following ink composition were mixed in a high-speed ice-cooled stirrer. The resultant mixture was filtered through a 5-μm membrane filter, to give a Yellow Ink A.

(Composition of Ink)

| Composition | Addition amount (mass part) |
|---|---|
| Yellow Millbase A | 12.0 |
| N-vinylcaprolactam | 25.0 |
| FANCRYL FA-512A | 29.4 |
| NK Ester AMP-10G | 20.0 |
| FIRSTCURE ST-1 | 0.05 |
| Lucirin TPO | 8.5 |
| Benzophenone | 3.0 |
| IRGACURE 184 | 2.0 |
| BYK-307 | 0.05 |

Example 10

A Yellow Ink B was obtained in the same manner as in Example 9, except that the Yellow Millbase A was replaced with the Yellow Millbases B.

Comparative Examples 5 and 6

Yellow Inks C and D were obtained in the same manner as in Example 9, except that the Yellow Millbase A was replaced with the Yellow Millbases C and D, respectively.

(Determination of the Average Particle Diameter $D_{50}$ and $\Delta D$ ($D_{90}-D_{10}$) of Pigment Particles in Ink)

Each ink above was analyzed by using FPAR-1000 (trade name) manufactured by Otsuka Electronics Co., Ltd., to measure the mass-average particle diameter and the number-average particle diameter of the colorant particles in the ink. Then, values of $D_{90}$, $D_{50}$, and $D_{10}$ were determined, which represent the particle diameters at the points where the integrated values of the number of colorant particles in the particle diameter distribution be 0.9 (90% in number to the total particle number), 0.5 (50% in number to the total particle number) and 0.1 (10% in number to the total particle number), respectively; and $\Delta D$ ($D_{90}-D_{10}$) was calculated from the resultant $D_{90}$ and $D_{10}$ values.

<Inkjet Image Recording Method>

Then, an image was formed on a recording medium, by using an inkjet recording test apparatus equipped with piezoelectric inkjet nozzles. The ink-supplying system had a stock tank, a supplying pipe, an ink-supplying tank immediately in front of the inkjet head, a filter, and a piezoelectric inkjet head, and the region from the ink-supplying tank to the inkjet head was insulated and heated. Temperature sensors were installed on the ink-supplying tank and the region close to the nozzles of the inkjet head, and the temperature was controlled to make the nozzle region always at a temperature of 45° C.±2° C. The piezoelectric inkjet head was operated under the condition of 8 to 30 pl of multi-sized dots being ejected at a resolution of 720×720 dpi. The light irradiation (exposure) system, the main scanning speed, and the injection frequency were adjusted in such a manner that UV ray was focused onto the exposure face at an illuminance of 1,000 mW/cm² after ink deposition and that irradiation be initiated, 0.1 second after deposition of the ink on the recording medium. The ultraviolet ray lamp utilized was HAN250NL Highcure mercury lamp (manufactured by GS Yuasa Corp.). The term "dpi," as referred to herein, means the number of dots per 2.54 cm. The substrate utilized was a polyethylene terephthalate film.

(Image Printing)

A solid image was outputted by four passes in the above-mentioned inkjet recording apparatus equipped with a piezoelectric head, at a resolution of 720 dpi×720 dpi, a maximum ink droplet quantity of 12 pl/pixel, a maximum ink deposition quantity in said solid image of 8.9 g/m², and an output density of 100%. The substrate utilized was a polyethylene terephthalate film. The flow rate of the external air on the surface of the substrate was controlled to less than 1 m/s.

(1. Evaluation of Image by Touching with Finger)

The state of the cured image thus obtained in the above was evaluated with touching with the finger, according to the following evaluation criteria:

~Evaluation Criterion~

4: Very favorable, with no image deformation observed even after touching with the finger;

3: No image deformation observed, but with some tackiness observed, after touching with the finger;

2: Image deformation observed, with some tackiness observed, after touching with the finger; and 1: Image deformation observed, after touching with the finger.

The results of evaluation are shown in Table 1.

(2. Evaluation of Discharging Stability)

Each ink was discharged continuously for 24 hours in the inkjet recording apparatus above, and a solid image was outputted onto a polyethylene terephthalate film at an output density of 100%. The number of white streaks occurred on the solid image obtained was counted, and the discharging stability of the ink was evaluated, according to the following criteria:

~Evaluation Criterion~

3: No occurrence of white streaks that means a non-printed region at all, all over the printed surface;

2: Occurrence of white streaks observed slightly; and

1: Occurrence of many white streaks observed all over the printed surface, which means non-allowable quality level in the practice.

The results of evaluation are shown in Table 1.

(3. Evaluation of Abrasion Resistance of Image)

The image thus prepared was rubbed with a folded tissue paper, and the abrasion resistance of the image was evaluated, according to the following criteria:

~Evaluation Criterion~

3: Almost no peeling of image observed after the rubbing test;

2: Partial peeling of image observed after the rubbing test; and

1: Almost completely peeled-off image observed after the rubbing test.

The results of evaluation are shown in Table 1.

TABLE 1

| Ink | | Average particle diameter (nm) | $D_{90}-D_{10}$ (nm) | 1. Evaluation of image by touching with finger | 2. Discharging stability | 3. Abrasion resistance |
|---|---|---|---|---|---|---|
| Magenta Ink A | Example | 19.8 | 30.1 | 4 | 3 | 3 |
| Magenta Ink B | Example | 25.5 | 38.7 | 4 | 3 | 3 |
| Magenta Ink C | Example | 37.2 | 45.9 | 4 | 3 | 3 |
| Magenta Ink D | Example | 45.6 | 48.8 | 4 | 3 | 3 |
| Magenta Ink E | Example | 28.5 | 33.8 | 4 | 3 | 3 |
| Magenta Ink F | Example | 48.8 | 89.3 | 3 | 3 | 3 |
| Magenta Ink G | Comparative Example | 110.8 | 130.8 | 1 | 1 | 1 |
| Magenta Ink H | Comparative Example | 56.2 | 96.2 | 2 | 2 | 2 |
| Magenta Ink I | Comparative Example | 54.8 | 109.5 | 1 | 2 | 2 |
| Cyan Ink A | Example | 22.2 | 40.8 | 4 | 3 | 3 |
| Cyan Ink B | Example | 40.1 | 73.2 | 4 | 3 | 3 |
| Cyan Ink C | Comparative Example | 60.1 | 94.1 | 2 | 2 | 2 |
| Yellow Ink A | Example | 20.3 | 40.8 | 4 | 3 | 3 |
| Yellow Ink B | Example | 44.6 | 71.9 | 4 | 3 | 3 |
| Yellow Ink C | Comparative Example | 68.9 | 93.9 | 2 | 2 | 2 |
| Yellow Ink D | Comparative Example | 110.8 | 150.8 | 1 | 1 | 1 |

The results above show that the ink properties of the ink of the present invention, in which the average diameter of the pigment fine-particles in ink is less than 50 nm and the value of $D_{90}-D_{10}$ is 100 nm or less, are remarkably improved, as compared to the inks for comparison containing pigment fine-particles falling outside of the specific range above.

(Evaluation of Superimposed Image)

Using the inkjet recording apparatus described above, an ink was supplied to form a solid image of the yellow ink C, and another ink was ejected to deposit thereon to form a solid image of said another ink, as shown in Table 2. Then, the thus-formed superimposed image was irradiated with UV ray, to record the image. The output voltage was controlled properly to make the irradiation illuminance of the ultraviolet ray 800 mW/cm².

(4. Evaluation of Transparency)

The image thus obtained was evaluated with the naked eye, according to the following evaluation criteria:

~Evaluation Criterion~

3: Yellowish background color development was favorable, and a high-density brilliant image in secondary color was obtained;

2: Yellowish background color development seems to thin, and color development of the image in secondary color was insufficient; and 1: Yellowish background color development was thin.

The results of evaluation are shown in Table 2.

(5. Evaluation of Ink Curability)

The image thus obtained was observed with the naked eye, and the ink curability was evaluated, according to the following criteria:

~Evaluation Criterion~

3: No intercolor blurring at the boundary of colors observed;

2: Some blurring of colors at the boundary and mixing of colors in a width of several mm observed; and 1: Extensive blurring of colors observed at the boundary and also colors of respective solid images mixed.

The results of evaluation are shown in Table 2.

(6. Evaluation of Abrasion Resistance of Image)

The image formed with each ink described above was rubbed with a folded tissue paper, and the abrasion resistance of the image was evaluated, according to the following criteria:

~Evaluation Criterion~

3: Almost no peeling of image observed after the rubbing test;

2: Partial peeling of image observed after the rubbing test; and

1: Almost completely peeled-off image observed after the rubbing test.

The results of evaluation are shown in Table 2.

TABLE 2

| Ink | | Average particle diameter (nm) | $D_{90}-D_{10}$ (nm) | 4. Transparency | 5. Ink curability | 6. Abrasion resistance |
|---|---|---|---|---|---|---|
| Magenta Ink A | Example | 19.8 | 30.1 | 3 | 3 | 3 |
| Magenta Ink C | Example | 37.2 | 45.9 | 3 | 3 | 3 |
| Magenta Ink D | Example | 45.6 | 48.8 | 3 | 3 | 3 |
| Magenta Ink E | Example | 28.5 | 33.8 | 3 | 3 | 3 |
| Magenta Ink H | Comparative Example | 56.2 | 96.2 | 1 | 2 | 2 |
| Magenta Ink I | Comparative Example | 54.8 | 109.5 | 1 | 1 | 1 |
| Cyan Ink A | Example | 22.2 | 40.8 | 3 | 3 | 3 |
| Cyan Ink B | Example | 40.1 | 73.2 | 3 | 3 | 3 |
| Cyan Ink C | Comparative Example | 60.1 | 94.1 | 1 | 2 | 2 |

The results above show that the ink properties of the ink of the present invention, in which the average diameter of the pigment fine-particles in ink is less than 50 nm and the value of $D_{90}$-$D_{10}$ is 100 nm or less, are remarkably improved, as compared to the inks for comparison containing pigment fine-particles falling outside of the specific range above.

(X-Ray Diffraction Measurement)

RINT 2500 (Trade Name, Manufactured by Rigaku Corp.) was Utilized, for the following X-ray diffraction measurement.

The Magenta Pigments A and E used in the magenta inks of the above examples were analyzed by X-ray diffraction with RINT 2500, manufactured by Rigaku Corp. The X-ray diffraction measurement was carried out by using a copper target and Cu—K$\alpha$1 line.

The crystallite diameter of each of the pigment particles was calculated from the spectrum obtained, and it was observed that the crystallite diameter of the colorant particles of the Magenta Pigment A was $10.8\pm2$ nm ($108\pm20$ Å) and that a halo was observed in the spectrum of the Magenta Pigment sample E at the region of $2\theta$ in the range of $4°$ to $70°$.

The Magenta Pigment C, Magenta Pigment D, Cyan Pigment A, and Cyan Pigment B were subjected to the X-ray diffraction measurement in the same manner as above, and the results showed that the crystallite diameters thereof are $21.2\pm2$ nm ($212\pm20$ Å), $25.8\pm2$ nm ($258\pm20$ Å), $15.8\pm2$ nm ($158\pm20$ Å), and $22.7\pm2$ nm ($227\pm20$ Å), respectively. From those results, it is understood that the pigment fine-particles contained in the Magenta Inks A, C, and D and Cyan Inks A and B each had a crystalline structure.

(Evaluation of Fastness to Light)

Each of the recorded articles obtained in the above examples was placed in a fademeter, followed by irradiation at an illuminance of 170,000 lux with a xenon lamp for 4 days, to conduct tests on fastness to light. The printed article prepared by using the Magenta Ink E containing the colorant particles showing halo in the X ray diffraction measurement, was observed with the naked eye that this article was faded slightly, as compared to the printed articles prepared by using the Magenta Inks A, C, and D and Cyan Inks A and B, respectively. On the other hand, especially the Magenta Ink C was observed with the naked eye that this article was higher in color density and showed favorable color development.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-025352 filed in Japan on Feb. 5, 2009, which is entirely herein incorporated by reference.

What I claim is:

1. A nonaqueous ink, comprising:
   colorant particles, a dispersant and a radical-polymerization compound;
   wherein the colorant particles having an average particle diameter of 1 nm or more and less than 50 nm, and having a ($D_{90}$-$D_{10}$) value of 100 nm or less are obtained by a precipitation process of bringing a colorant dissolved solution into contact with an aqueous medium, at least one of the pigment dissolved solution and the aqueous medium containing the dispersants, to form a dispersion, and further comprising the steps of
   (i) aggregating the colorant particles into redispersible agglomerates, and separating the agglomerates from the dispersion,
   (ii) redispersing the agglomerates to form fine particles redispersed in a redispersion medium, and
   (iii) bringing the agglomerates into contact with an organic solvent for increasing crystallinity of the colorant particles;
   wherein $D_{90}$-$D_{10}$ is a value obtained by subtracting $D_{10}$ from $D_{90}$; $D_{90}$ and $D_{10}$ represent respectively the particle diameters at cumulative colorant particle numbers of 0.9 (90 number %) and 0.1 (10 number %) in an integral value of the distribution function $dG=F(D) dD$; and G represents the number of the pigment particles; and D represents the diameter of the particles;
   wherein the colorant particles comprise quinacridone pigment particles or azo pigment particles;
   wherein the colorant particles have a crystalline structure as determined by a powder X-ray diffraction analysis, such that the colorant particles do not show a halo specific to an amorphous substance, and wherein the crystallite diameter of the colorant particles is 5 nm or more; and
   wherein the radical-polymerization compound is a monofunctional radically polymerizable monomer containing only one ethylenic unsaturated group selected from the group consisting of an acrylate group, a methacrylate group, an acrylamide group, a methacrylamide group and a N-vinyl group.

2. The nonaqueous ink according to claim 1, wherein the dispersant is a polymer compound.

3. The nonaqueous ink according to claim 1, further comprising a radical polymerization initiator.

4. The nonaqueous ink according to claim 1, wherein the ink contains the monofunctional radically polymerizable monomer in an amount of 65 mass % or more in the ink.

5. The nonaqueous ink according to claim 1, wherein the ink is an inkjet recording ink.

6. An image-forming method, which comprises:
   preparing a material for recording, the nonaqueous ink according to claim 1, and an image-forming apparatus; and
   recording an image of the nonaqueous ink on the material with the image-forming apparatus.

7. An image-forming apparatus, comprising:
   a storage unit containing the nonaqueous ink according to claim 1; and an image-forming unit;
   whereby an image of the nonaqueous ink is recorded on a material with the image-forming unit.

8. A recorded article comprising: a material for recording and an image formed on the material with the nonaqueous ink according to claim 1.

9. The nonaqueous ink according to claim 1, wherein the radical-polymerization compound is selected from the group consisting of N-vinylcarbazole, 1-vinylimidazole and N-vinyllactam.

10. The nonaqueous ink according to claim 1, wherein the colorant particles comprise quinacridone pigment particles, and the quinacridone pigment is selected from the group consisting of CIPR122, CIPR202 and CIPV19.

11. The nonaqueous ink according to claim 1, wherein the colorant particles comprise azo pigment particles, and the azo pigment is selected from the group consisting of CIPY74 and CIPY128.

* * * * *